(12) United States Patent
Suina et al.

(10) Patent No.: US 8,897,289 B2
(45) Date of Patent: *Nov. 25, 2014

(54) NODE SYSTEM AND SUPERVISORY NODE

(71) Applicant: Spansion LLC, Sunnyvale, CA (US)

(72) Inventors: Kenji Suina, Yokohama (JP); Takashi Arai, Yokohama (JP); Koichi Mita, Yokohama (JP); Akira Shimamura, Yokohama (JP); Hidetoshi Ishikawa, Yokohama (JP); Takashi Moriya, Yokohama (JP); Yuuki Nozawa, Yokohama (JP); Hideki Kondo, Yokohama (JP)

(73) Assignee: Spansion LLC, Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/221,011

(22) Filed: Mar. 20, 2014

(65) Prior Publication Data

US 2014/0286330 A1    Sep. 25, 2014

Related U.S. Application Data

(63) Continuation of application No. 13/219,211, filed on Aug. 26, 2011, now Pat. No. 8,718,038.

(30) Foreign Application Priority Data

Nov. 29, 2010   (JP) ................. 2010-265643

(51) Int. Cl.
*H04J 3/06*      (2006.01)
*H04W 56/00*  (2009.01)

(52) U.S. Cl.
CPC .................. *H04W 56/001* (2013.01)

USPC ........................................... 370/350

(58) Field of Classification Search
USPC ........................ 370/442, 324, 350
See application file for complete search history.

(56) References Cited

U.S. PATENT DOCUMENTS

| 7,430,261 B2 | 9/2008 | Forest et al. |
| 7,586,953 B2 | 9/2009 | Forest et al. |
| 8,089,991 B2 | 1/2012 | Ungermann |

(Continued)

FOREIGN PATENT DOCUMENTS

| JP | 09-046762 A | 2/1997 |
| JP | 2005-341148 A | 12/2005 |
| JP | 2008-294656 A | 12/2008 |
| WO | WO 02/021743 A1 | 3/2002 |

OTHER PUBLICATIONS

FlexRay Communications System Protocol Specification, Dec. 15, 2011, Version 2.1, Chapters 7-9.

(Continued)

*Primary Examiner* — Mohammad Anwar
(74) *Attorney, Agent, or Firm* — Sterne, Kessler, Goldstein & Fox P.L.L.C.

(57) ABSTRACT

A node system includes a first node, a second node, and a supervisory node which transmit frames while increasing or decreasing the cycle microtick count, and determines reduced cycle microtick counts by subtracting or adding a rate correction limit value from or to the cycle microtick count of the supervisory node when reception of the first frame transmitted by the first node stop and the cycle microtick count of the supervisory node when reception of the first and second frames stop.

17 Claims, 27 Drawing Sheets

(56) References Cited

U.S. PATENT DOCUMENTS

| | | |
|---|---|---|
| 8,718,038 B2 * | 5/2014 | Suina et al. .................. 370/350 |
| 2004/0081193 A1 | 4/2004 | Forest et al. |
| 2005/0141565 A1 | 6/2005 | Forest et al. |
| 2012/0134457 A1 | 5/2012 | Suina et al. |

OTHER PUBLICATIONS

Japanese Office Action directed to related Japanese Patent Application No. 2010-265643, mailed Aug. 1, 2014.

English Language Abstract of Japanese Patent Application Publication No. 2005-341148 A, published Dec. 8, 2005.

* cited by examiner

NODE SYSTEM AND SUPERVISORY NODE

CROSS-REFERENCE TO RELATED APPLICATION

This application is a continuation of U.S. patent application Ser. No. 13/219,211 filed Aug. 26, 2011, which claims priority to Japanese Application No. 2010-265643 filed Nov. 29, 2010, the disclosures of which are incorporated by reference herein in their entireties.

FIELD

The embodiments relates to a node system and a supervisory node.

BACKGROUND

In a distributed control type network having a plurality of nodes, each node has a clock generator. These nodes manage a cycle of data communication based on the clocks generated by the respective clock generator. However the frequency of each clock generator (clock frequency) has a subtle error. Therefore each node performs data communication while synchronizing with other nodes, so that the communication cycles do not deviate due to an error of the clock frequency. The distributed control method is also used for the FlexRay protocol, which is suitable for increasing the speed of an on-vehicle LAN (Local Area Network). (For example, refer to Japanese Laid-Open Patent Publication Nos. 9-46762 and 2008-294656, and FlexRay Communications System Protocol Specification Version 2.1, Chapter 9, 2005.)

SUMMARY

According to an aspect of the present system, a node system in which a plurality of nodes are connected via a transmission line is provided, where each of the plurality of nodes includes a clock generator, and a communication controller which transmits a frame in a slot assigned based on a microtick generated every time the clock generator generates a first certain number of clocks in a continuously repeated cycle, and manages an initial value of a cycle microtick count corresponding to a cycle length of the cycle and a rate correction value for the initial value.

Here a first node among the plurality of nodes, which transmits a first frame in a first slot, repeatedly corrects a first rate correction value so that cycles of the plurality of nodes synchronize, stops the transmission of the first frame when an absolute value of the first rate correction value exceeds a certain rate correction limit value, and transmits the first frame in the first slot based on the corrected first rate correction value when the absolute value is within the rate correction limit value.

A second node among the plurality of nodes, which transmits a second frame in a second slot, repeatedly corrects a second rate correction value so that cycles of the plurality of nodes synchronize, stops the transmission of the second frame when an absolute value if the second rate correction value exceeds the rate correction limit value, and transmits the second frame in the second slot based on the corrected second rate correction value when the absolute value is within the rate correction limit value.

A supervisory node among the plurality of nodes, which transmits a third frame in a third slot. transmits the third frame in the third slot while increasing or decreasing the cycle microtick count, and determines a reduced cycle microtick counts by subtracting or adding the rate correction limit value from or to the cycle microtick count of the supervisory node when reception of the first and second frames stop.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

As described previously, the distributed control method is used for the FlexRay protocol. In the case of the FlexRay protocol, each node sequentially corrects the respective cycle length (duration of the cycle) based on the time when a frame is received from another node, so that the respective cycle length is converged to a certain value.

With this synchronization method, however, the synchronization step is taken regardless the original cycle length corresponding to the clock frequency. Therefore the cycle length of each node tends to converge to a position deviated from the center of the original cycle length distribution. As a result, step out (stop of synchronization function) tends to occur.

Preferred embodiments of the present invention will be explained with reference to accompanying drawings.

Embodiment 1

(1) Structure

Figure 1:
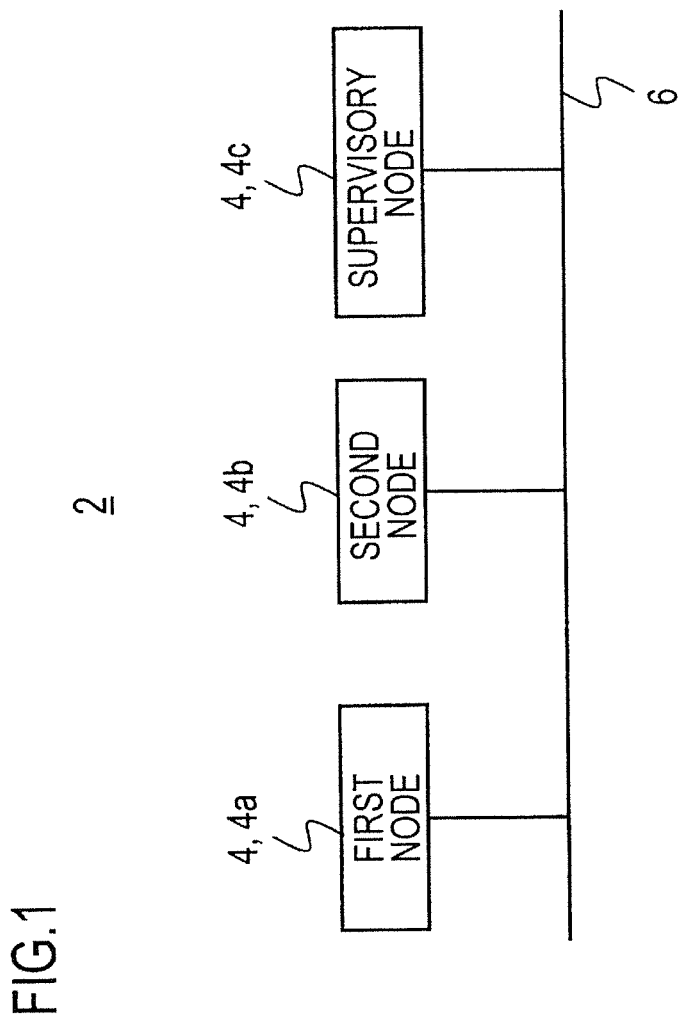
FIG. 1 is a block diagram of a node system of an embodiment 1.
Figure 2:
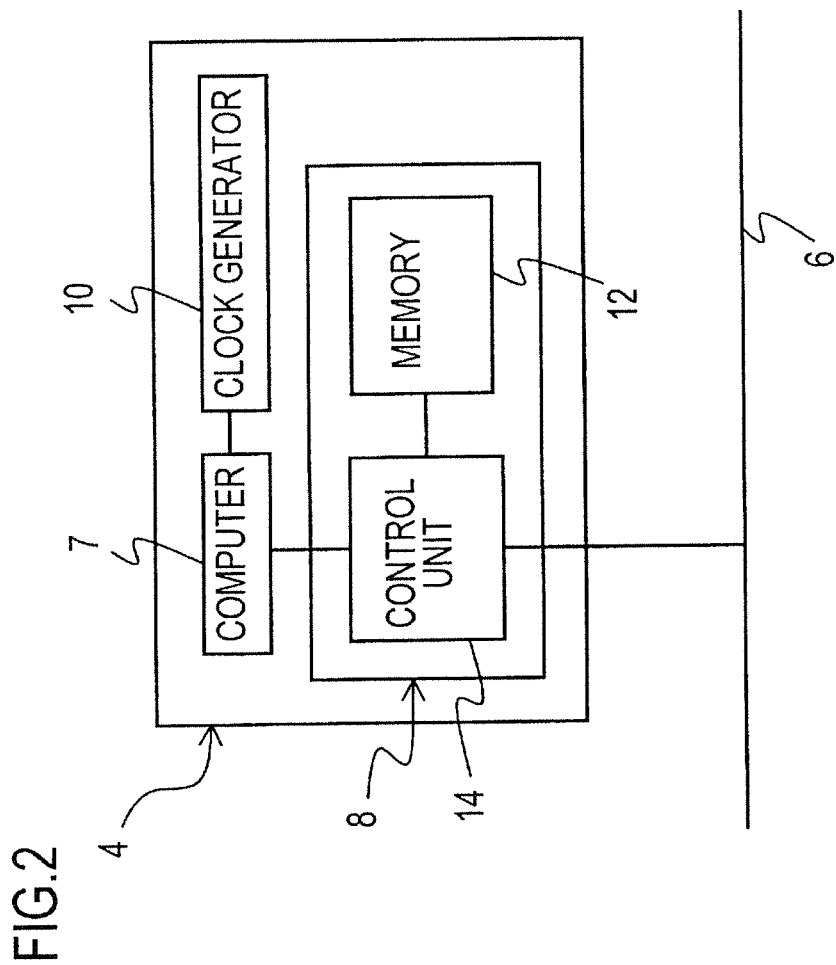
FIG. 2 is a block diagram of each node included in the node system of the embodiment 1.
Figure 3:
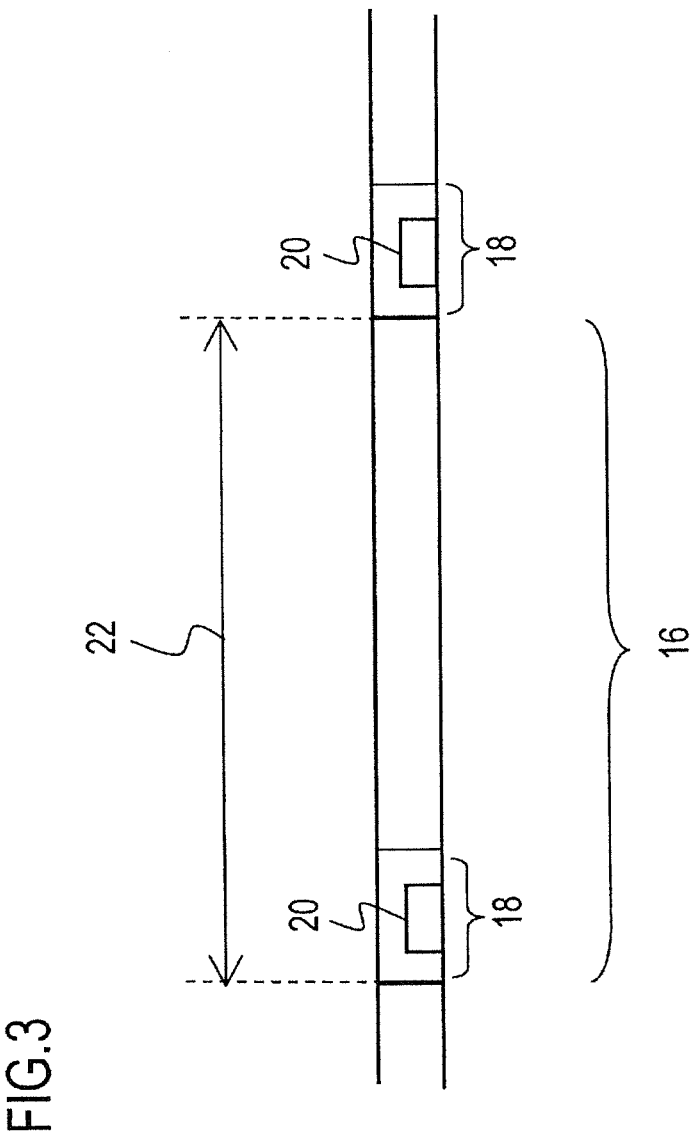
FIG. 3 is a drawing illustrating a method for transmitting frames in each node of the embodiment 1 (part 1)
Figure 4:
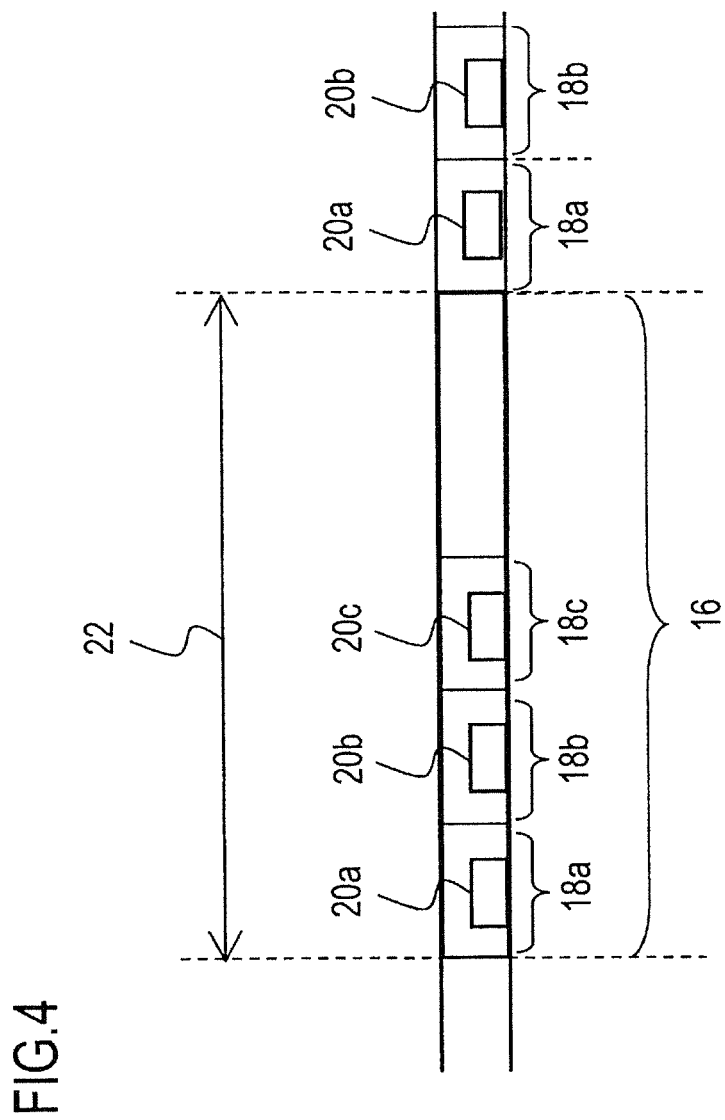
FIG. 4 is a drawing illustrating a method for transmitting frames in each node of the embodiment 1 (part 2)

FIG. 1 is a block diagram of a node system (cluster) 2 of an embodiment 1. FIG. 2 is a block diagram of a plurality of nodes 4 of a node system. FIG. 3 and FIG. 4 are drawings illustrating a method for transmitting frames in a plurality of nodes 4.

As FIG. 1 illustrates, this node system 2 has a plurality of nodes 4, and a transmission line 6 to which the plurality of nodes 4 are connected. Each of the plurality of nodes 4 has a computer 7 (e.g. microcomputer), a communication controller 8 and a clock generator 10, as illustrated in FIG. 2.

Clocks generated by the clock generator 10 are supplied to the communication controller 8 via a computer 7, for example. The computer 7 is connected to such an external device as a position sensor of a brake pedal and a control device of wheels. The computer 7 obtains information on the external device (e.g. position of the brake pedal) or controls the external device (e.g. damping device of wheels). In this case, the plurality of nodes 4 controls the external device while exchanging information with other nodes via the communication controller 8.

The communication controller 8 has a memory 12 (e.g. register or RAM (Random Access Memory)) and a control unit 14, as illustrated in FIG. 2. The control unit 14 is a logic circuit, such as an FPGA (Field-Programmable Gate Array) or CPU (Central Processing Unit) which is programmed to implement functions of the control unit.

As FIG. 3 illustrates, the communication controller 8 transmits a frame in a slot 18 assigned based on a microtick which is generated every time the clock generator 10 generates a certain number (e.g. 1, 2, 4) of clocks in a continuously repeated cycle 16. A cycle here refers to a most significant composing element of time in each node. A microtick (hereafter μT), on the other hand, is a minimum unit of a time in each node.

The communication controller 8 manages an initial value (e.g. 100,000) of a cycle microtick count corresponding to a cycle length 22 of a cycle 16 (e.g. 10,000 μs), and a rate correction value for this initial value. This initial value of cycle microtick count (hereafter called "cycle μT count") and the rate correction value are recorded in the memory 12. Here the initial value of the cycle μT count is a global constant common to the plurality of nodes 4.

As FIG. 1 illustrates, the plurality of nodes 4 are a first node 4a, a second node 4b and a supervisory node 4c. As illustrated in FIG. 4, the first node 4a transmits a first frame 20a in a first slot 18a. The second node 4b transmits a second frame 20b in a second slot 18b. The supervisory node 4c transmits a third frame 20c in a third slot 18c.

—First Node—

Figure 5:
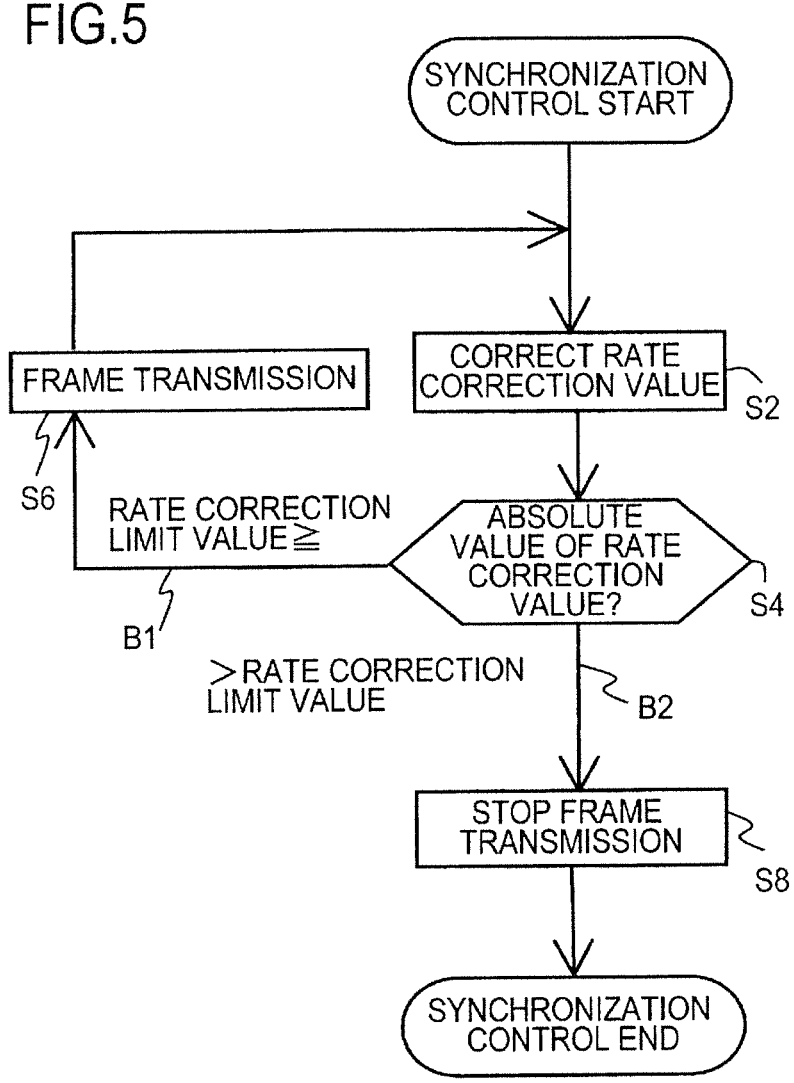
FIG. 5 is a flow chart depicting synchronization control of the first node and the second node.

FIG. 5 is a flow chart depicting synchronization control of the first node 4a and the second node 4b.

The first node 4a repeatedly corrects a first rate correction value (a rate correction value managed by the first node 4a) so that the cycles of the plurality of nodes 4 synchronize (S2→B1→S2). The "cycles of the plurality of nodes synchronize" means that starts or ends of each cycle in all of the plurality of nodes occur together.

If the absolute value of the first rate correction value exceeds a certain rate correction limit value (e.g. 2 to 1923 μT) (S4→B2), the first node 4a stops transmission of the first frame 20a (step S8). If the absolute value of the first rate correction value is within the correction limit value (S4→B1), on the other hand, the first node 4a transmits the first frame 20a in the first slot 18a based on the corrected first rate correction value (step S6). Here the rate correction limit value (>0) is a global constant common to the plurality of nodes 4. Correcting the rate correction value is hereafter referred to as the "rate correction".

—Second Node—

A synchronizing method for the second node 4b is approximately the same as the synchronizing method for the first node 4a.

In other words, the second node 4b repeatedly corrects a second rate correction value (a rate correction value managed by the second node 4b) so that the cycles of the plurality of nodes 4 synchronize (S2→B1→S2). If the absolute value of the second rate correction value exceeds the rate correction limit value (S4→B2), the second node 4b stops transmission of the second frame 20b (step S8). If the absolute value of the second rate correction value is within the correction limit value (S4→B1), on the other hand, the second node 4a transmits the second frame 20b in the second slot 18b based on the corrected second rate correction value (step S6).

—Supervisory Node—

Just like the first and second nodes 4a and 4b, the supervisory node 4c transmits a third frame 20c in a third slot 18c while repeatedly correcting a third rate correction value (a rate correction value managed by the supervisory node 4c). If it is determined that each cycle length of the plurality of nodes 4 is in a range of a certain width (e.g. 10 μT) for a certain number of times (e.g. 5 times) or more, the supervisory node 4c transmits the third frame 20c in the third slot 18c while increasing (or decreasing) the cycle μT count 22.

Responding to the change of the cycle length 22, the first and second nodes 4a and 4b increase (or decrease) the first and second rate correction values, and eventually stop transmission of the first and second frames 20a and 20b respectively.

The supervisory node 4c determines a plurality of reduced cycle μT count by subtracting (or adding) the above mentioned rate correction limit value from (to) the cycle μT count (of the supervisory node 4c) when the reception of the first and second frames 20a and 20b stopped.

Then the supervisory node 4c has the first and second nodes 4a and 4b, which stopped transmission of the first and second frames 20a and 20b, restart transmission of the first and second frames 20a and 20b and correction of the first and second rate correction values respectively. The supervisory node 4c sets a intermediate value of the reduced cycle μT counts (a value between the maximum value and the minimum value of a plurality of values, such as a mean value), as the cycle μT count of the supervisory node 4c, and repeatedly transmits the third frame 20c in the third slot 18c.

The hardware configuration of the supervisory node 4c is approximately the same as the first and second nodes 4a and 4b. The control unit 14 of the supervisory node 4c, however, is constructed to fulfill the above mentioned function. The memory of the supervisory node 4c has an area which the memories of the first and second nodes 4a and 4b do not have.

Figure 6:
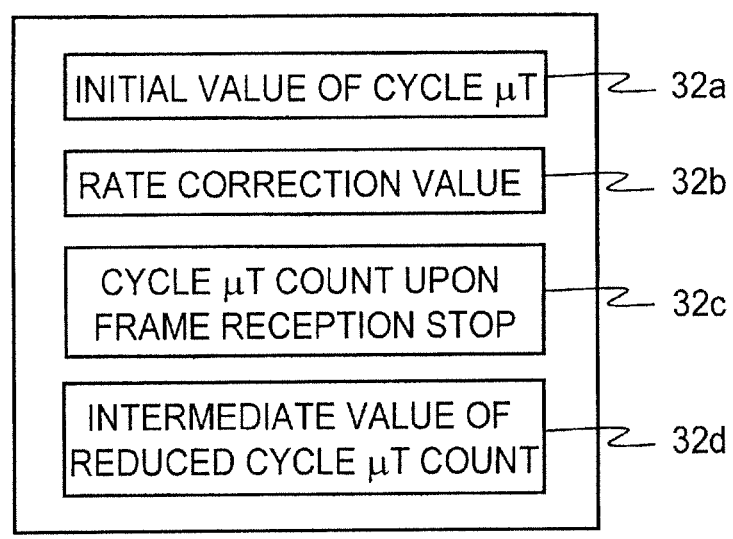
FIG. 6 is a block diagram of a memory of the supervisory node.

FIG. 6 is a block diagram of a memory 12a of the supervisory node 4c. As FIG. 6 indicates, the memory 12a of the supervisory node 4c has a first memory area 32a for recording an initial value of the cycle μT count, and a second memory area 32b for recording a rate correction value. The memory 12a of the supervisory node 4c also has a third memory area 32c for recording cycle μT counts when reception of the first and second frames 20a and 20b stopped, and a fourth memory area 32d for recording a intermediate value of the reduced cycle μT count.

The first to the fourth memory areas 32a to 32d are registers, for example. Or the first to the fourth memory areas 32a to 32d are a plurality of memory areas created in RAM. The first and second memory areas 32a and 32b are common memory areas created in the first and second nodes 4a and 4b as well.

(2) Operation

Figure 7:
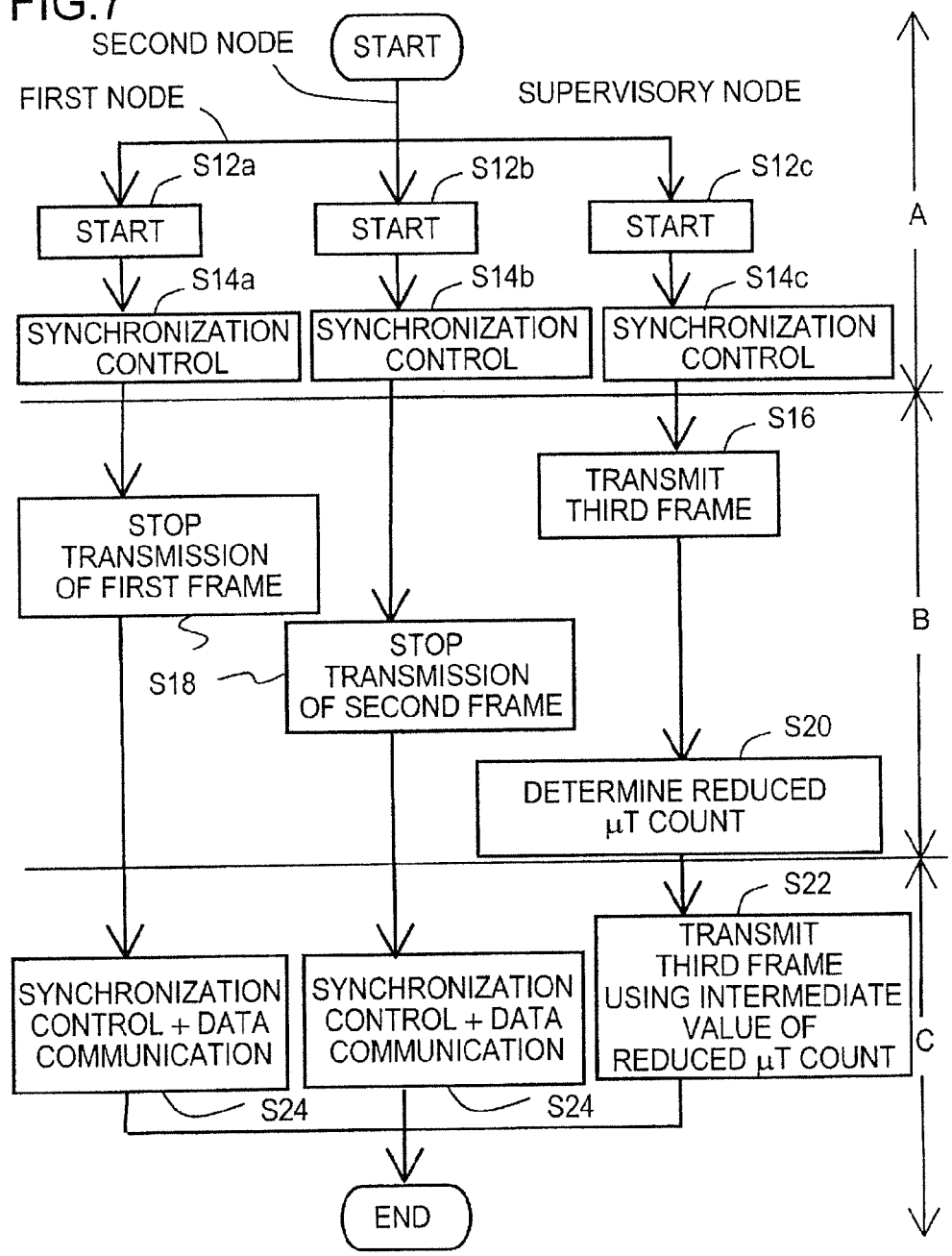
FIG. 7 is a flow chart depicting an operation of the node system of the embodiment 1.
Figure 8:
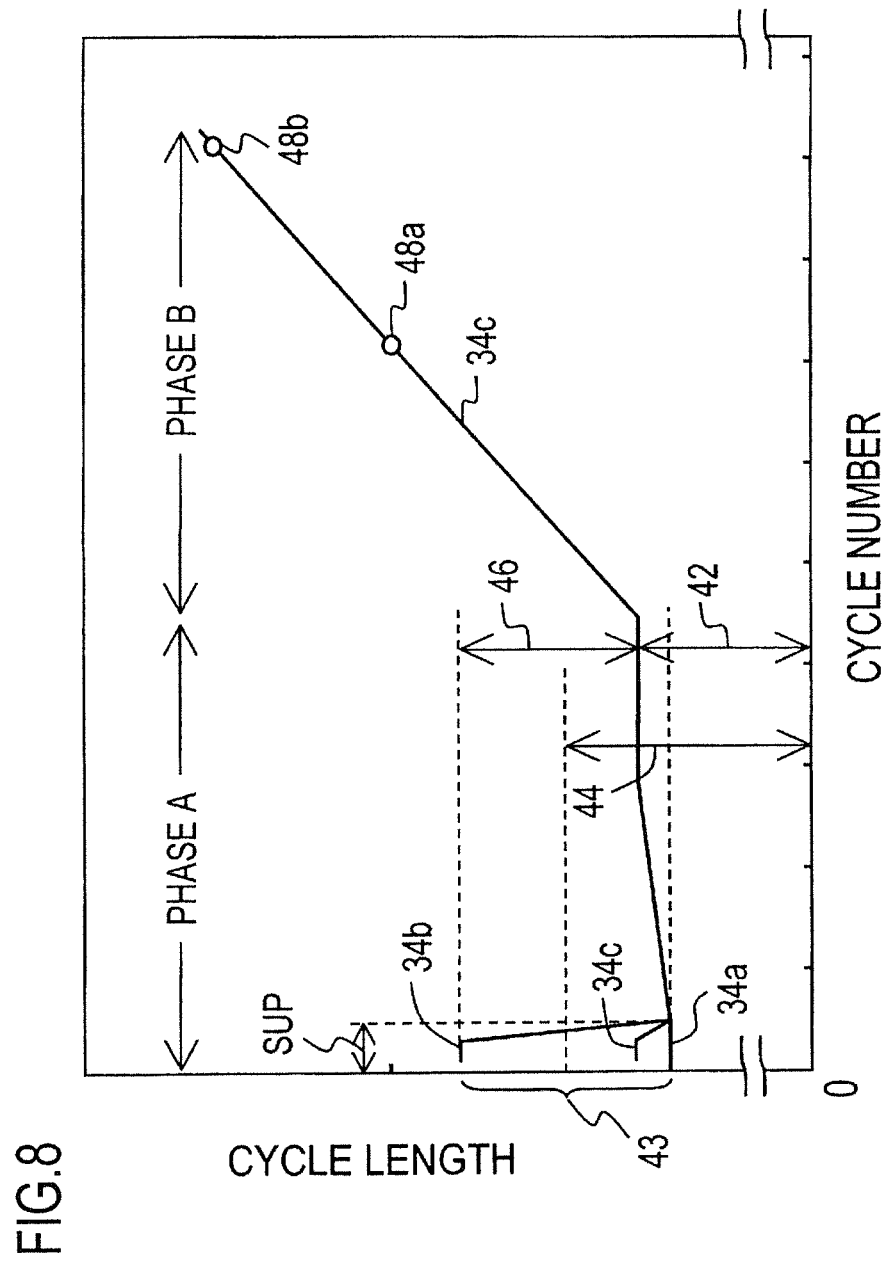
FIG. 8 is a diagram depicting a change of a cycle length of each node in phase A and phase B.

FIG. 7 is a flow chart depicting an operation of the node system 2. As FIG. 7 depicts, the operation of this node system 2 may be divided into three phases. FIG. 8 is a diagram depicting a change of a cycle length of each node in phase A and phase B. The abscissa axis is a cycle number of the first node 4a. The initial value of the cycle number is 0, and increments by one each time a cycle is generated. The ordinate axis is a cycle length. FIG. 8 indicates a cycle length 34a of the first node 4a and a cycle length 34b of the second node 4b, and a cycle length 34c of the supervisory node 4c.

Now the operation of this node system 2 in each phase A to B will be described. Unless otherwise specified, the operation to be described hereinbelow is the operation performed by the communication controller 8 of each node. This is the same for the other embodiments.

—Phase A—

TABLE 1

Error of clock frequency

| | First Node | Second Node | Supervisory Node |
|---|---|---|---|
| Error of clock frequency (ppm) | 0 | −3,000 | −500 |

Table 1 is an example of the frequency error of the clock generator 10 of each node 4a, 4b and 4c. In the example in Table 1, the frequency errors of the first node 4a, the second node 4b and the supervisory node 4c are 0 ppm, −3000 ppm and −500 ppm respectively. The clock frequency of the first node 4a is 40 MHz, for example. Therefore if a microtick is generated every time four clocks are generated, 1 μT of the first node 4a corresponds to 0.1 μs. 1 μT of the second node 4b and 1 μT of the supervisory node 4c are 0.1003 μs and 0.10005 μs respectively.

Figure 9:
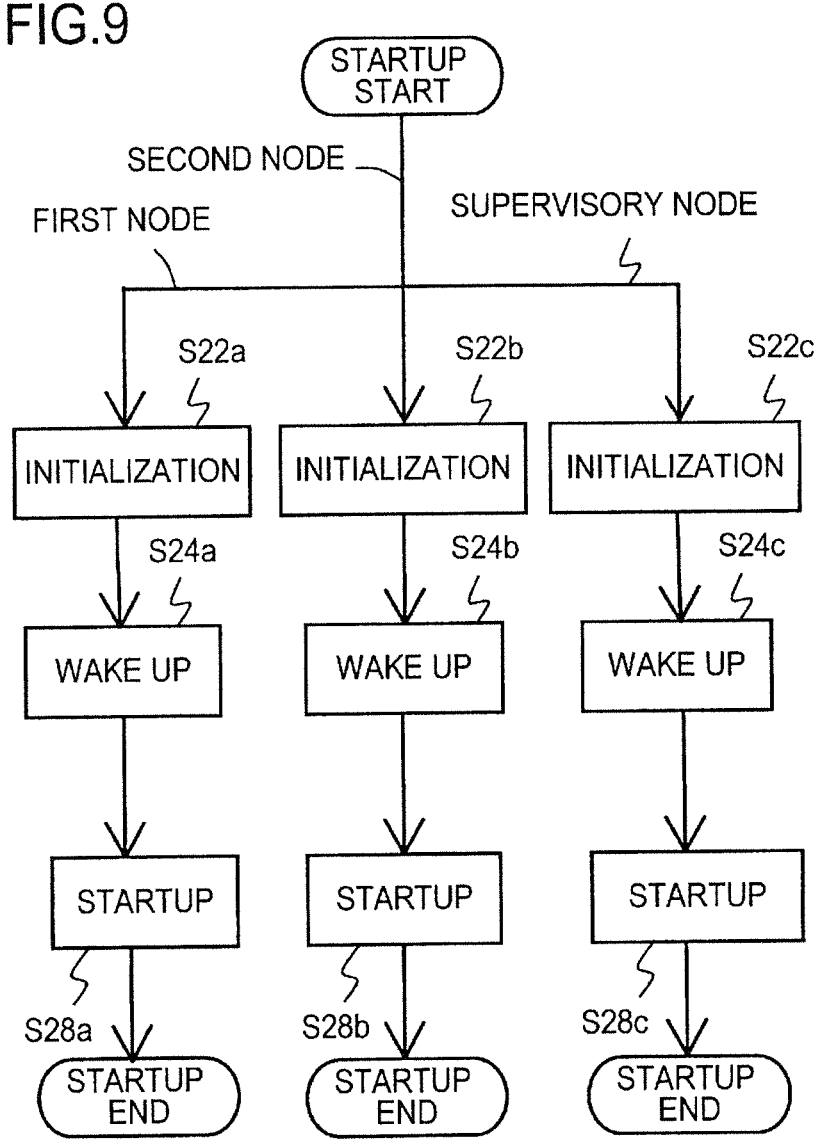
FIG. 9 is a flow chart depicting the procedure of the startup steps of each node.

As FIG. 7 depicts, in phase A, each node is started up (S12a to S12c), and then transmits frames while synchronizing with one another (S14a to S14c). FIG. 9 is a flow chart depicting the procedure of the startup steps S12a to S12c of each node.

If power is supplied to each node, the communication controller 8 of each node is initially set (configured) by each computer 7 (S22a to S22c).

TABLE 2

Initial setting values

| | First Node | Second Node | Supervisory Node |
|---|---|---|---|
| Cycle μT count | 100,000 | 100,000 | 100,000 |
| Rate correction value | 0 | 0 | 0 |
| Initial value of cycle length (μs) | 100,000 | 100,030 | 100,005 |

Table 2 is an example of the initially set cycle μT count in the memory 12 and in the initially set rate correction value. In the fourth row of Table 2, the initial value of the cycle length (cycle time) of each node is also listed. As indicated by Table 2, the cycle μT count is initially set to a same value (e.g. 100,000 μT) for all nodes. The rate correction value is also initially set to 0 μT for all nodes.

For example, an external switch (not illustrated) is connected to the first node 4a. If the external switch generates an external signal, the first node 4a wakes up responding to this external signal (S24a). Then the first node 4a transmits a wake up signal.

"Wake up" here refers to becoming a state where the next startup step S28a to S28c (communication preparation step) may be entered. The second node 4b and the supervisory node 4c wake up responding to the wake up signal transmitted by the first node 4a (S24b and S24c).

If at least one of the second node 4b and the supervisory node 4c wakes up, the first node 4a advances to a startup step (S28a).

The first node 4a advanced to the startup step sets the first frame 20a to a startup frame, and transmits a first frame 20a in four continuous cycles. The startup frame is a frame which another node uses for startup.

In a header segment of each of the first to the third frames 20a to 20c, a startup frame indicator is set. A frame of which startup frame indicator is set to "1" is a startup frame. The first and the second nodes 4a and 4b determine whether a received frame is a startup frame or not by detecting the value of the startup frame indicator.

TABLE 3

Cycle μT count and cycle length in startup period

| | First Node | Second Node | Supervisory Node |
|---|---|---|---|
| Cycle μT at start of startup | 100,000 | 100,000 | 100,000 |
| Cycle μT count at end of startup | 100,000 | 99,700 | 99,950 |
| Cycle length at start of startup (μs) | 10,000 | 10,030 | 10,005 |
| Cycle length at end of startup (μs) | 10,000 | 10,000 | 10,000 |

Table 3 is an example of the cycle μT count and the cycle length at the start and at the end of the startup period. In the second row and the third row in Table 3, cycle μT counts at the start of the startup step (S28a to S28c) and those at the end of the startup step are listed. In the fourth row and the fifth row in Table 3, the cycle lengths corresponding to the cycle μT counts in the second row and those in the third row are listed.

As Table 3 indicates, the first node 4a maintains the cycle μT count at the initial value (e.g. 100,000) thereof during the startup period. As mentioned above, the first node 4a transmits the first frame 20a (startup frame) in continuous four cycles during the startup period.

On the other hand, the second node 4b and the supervisory node 4c receives the first frame 20a in the first two cycles out of the above mentioned continuous four cycles, and measures the difference of the receiving times. In the two cycles after the first two cycles, the second node 4b and the supervisory node 4c correct the respective microtick counts, so that the respective cycle length matches this time difference (see Table 3). The above is the startup step of the second node 4b and the supervisory node 4c (S28b and S28c).

By the startup step, the second node 4b and the supervisory node 4c approximately match the respective cycle lengths 34b and 34c with the cycle length 34a of the first node 4a, as indicated in the startup period SUP in FIG. 8. Furthermore the second node 4b and the supervisory node 4c match the respective cycle start time with the cycle start time of the first node 4a.

When the startup step (S12a to S12c) ends, each node advances the synchronization step (S14a to S14c) (see FIG. 7). As depicted in FIG. 8, in the synchronization step, each node transmits frames while synchronizing with one another, and converges the respective cycle length to a, value 42 between the maximum value and the minimum value of the initial cycle length value (initial value of cycle length). During this time, each node repeatedly corrects the respective rate correction value.

Figure 10:
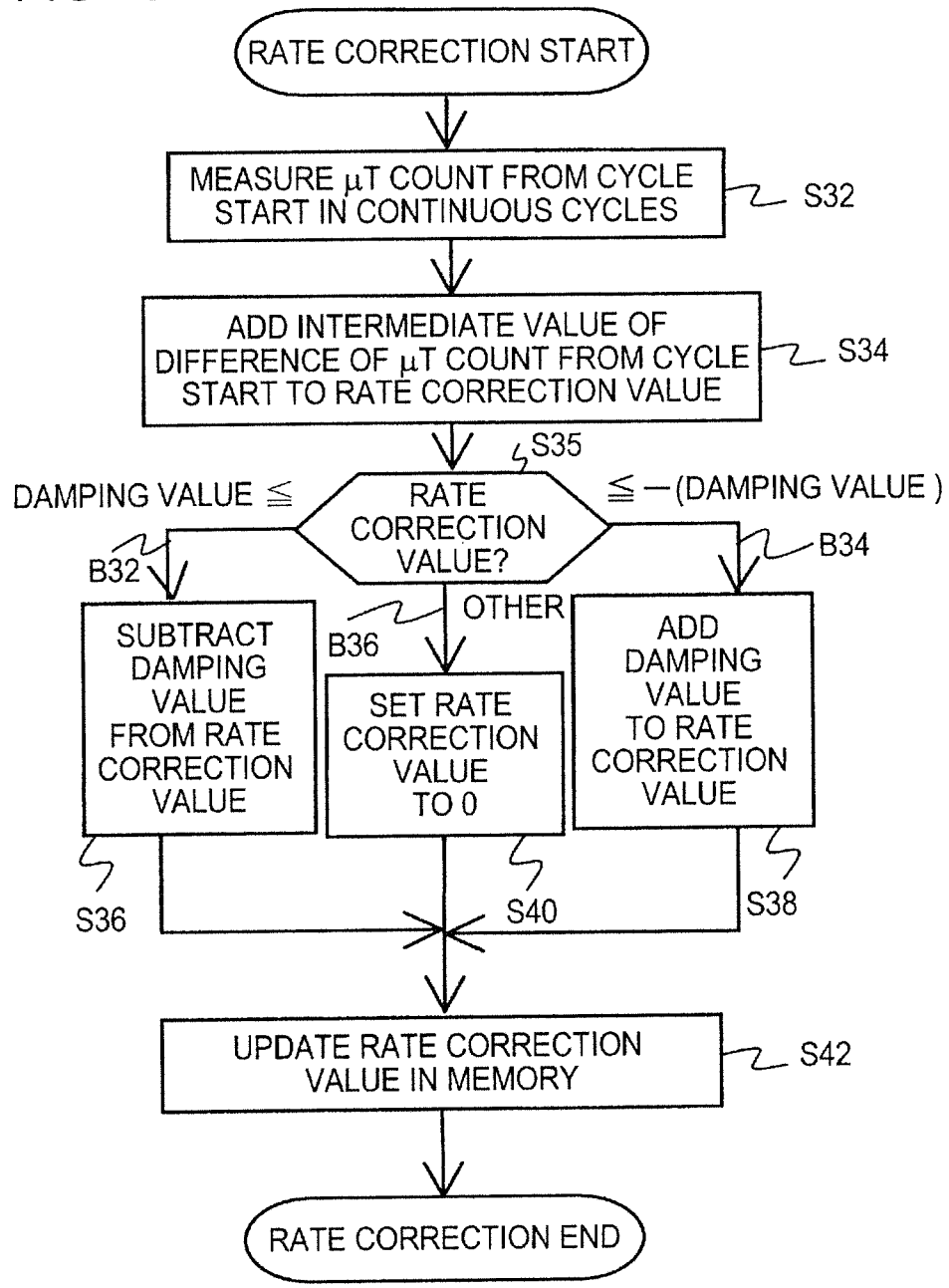
FIG. 10 is a flow chart depicting the rate correction of each node.
Figure 11:
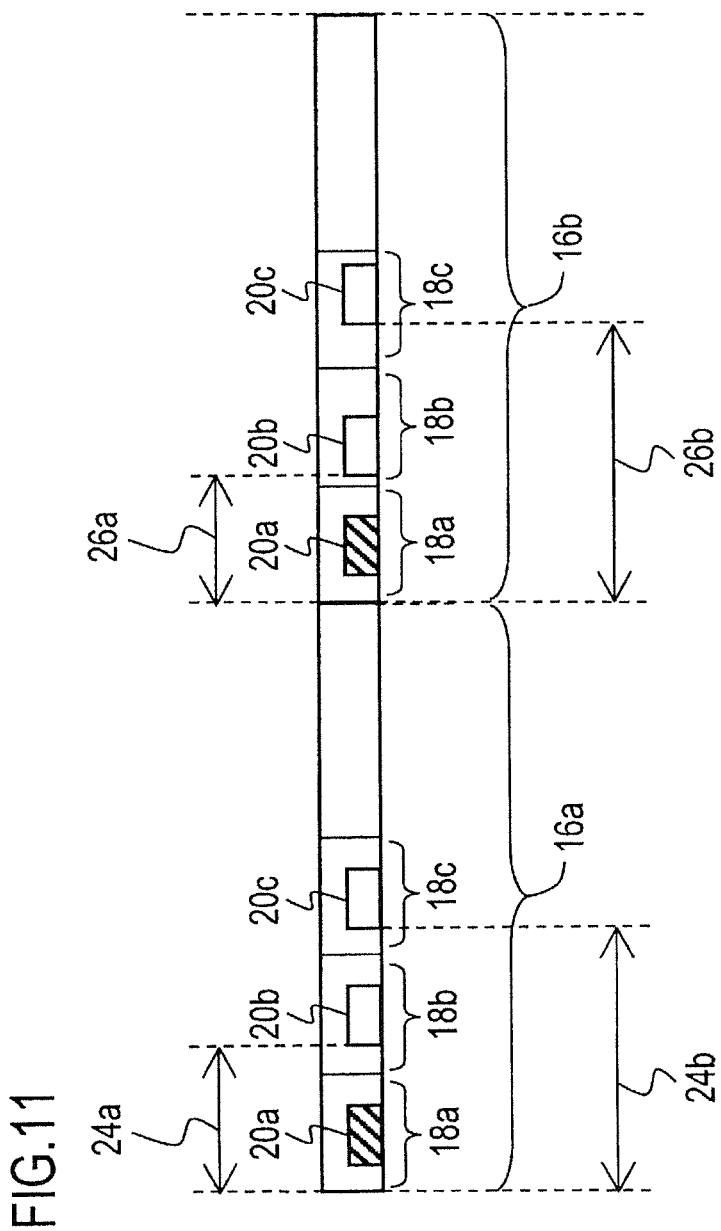
FIG. 11 is a time chart depicting the rate correction of the first node.

FIG. 10 is a flow chart depicting the rate correction of each node. FIG. 11 is a time chart depicting the rate correction of the first node 4a. First the rate correction operation of the first node 4a will be described.

As FIG. 11 illustrates, the first node 4a measures the first microtick counts 24a and 24b from the start of the cycle for each of the first to third frames 20a to 20c received in the first cycle 16a (step S32). As mentioned later, the first node 4a does not measure the microtick count for the first frame 20a. "A microtick count from the start of the cycle for a received frame" refers to a number of microticks generated from the start point of the cycle to the point of receiving this frame.

In the same manner, the first node 4a measures the second microtick counts 26a and 26b from the start of the cycle for each of the first to third frames 20a to 20c received in the second cycle 16b following the first cycle 16a (step S32).

The first node 4a of the embodiment 1 does not receive the first frame 20a that this first node 4a itself transmits. In other words, the first frame 20a is not a frame to be received. Therefore the microtick count for the first frame 20a is not measured. However as described below, the result of the rate correction operation is approximately the same even if the first node 4a receives the first frame 20a and measures the first and second microtick counts. This is the same for the second node 4b and the supervisory node 4c.

Then the first node 4a determines the difference between the first and second microtick counts (hereafter called "first difference") for each of the first to third frames 20a to 20c, and adds a intermediate value thereof (hereafter called "first intermediate value") to the first rate correction value (step S34). The first intermediate value here is, for example, a later mentioned fault-tolerant mid-point. If the supervisory node 4c transmits only one third frame 20a in the third slot 18c as depicted in FIG. 4, the first intermediate value is preferably a value generated by rounding up or rounding off a mean value of the first differences.

If the added first rate correction value is a certain damping value (e.g. 5 μT) or more (S35→B32), the first node 4a subtracts the damping value (>0) from the added first rate correction value, so as to correct the first rate correction value (step S36). The damping value is a global constant which is commonly used by the plurality of nodes 4.

If the added first rate correction value is a negative value corresponding to the damping value (e.g. −10 in the case of 10) or less (S35→B34), on the other hand, the first node 4a adds the damping value to the added first rate correction value to correct the first rate correction value. If an absolute value of the added first rate correction value is smaller than the damping value (S35→S36), the first node 4a corrects the first rate correction value to 0 (step S40). Finally the first node 4a updates the data of the second memory area 32b with the corrected first rate correction value (step S42).

Each time the rate correction operation ends once, the first node 4a transmits the first frame 20a in the two cycles (not illustrated) following the second cycle 16b (step S6 in FIG. 5). The cycle μT count of the subsequent two cycles is a value generated by adding the updated rate correction value in the second memory area 32b to the initial value of the cycle μT count recorded in the first memory area 32a of the memory 12.

The cycle length of the first node 4a and the cycle lengths of the second node 4b and the supervisory node 4c become close by adding the first intermediate value to the first rate correction value. On the other hand, the cycle length of the first node becomes close to the initial cycle length value thereof by adding or subtracting the damping value to/from the first rate correction value. As a result, as depicted in FIG. 8, cycles of the plurality of nodes 4 synchronize with one another, and the respective cycle length 22 converges to a value 42 between the maximum value and the minimum value of the cycle lengths of the plurality of nodes 4 (in other words, each cycle length enters a range of a certain width (e.g. damping value×2) of which center is the value 42).

In the same manner, the second node 4b corrects the second rate correction value. In other words, the second node 4b measures the third and fourth microtick counts for the first to the third frames 20a to 20c received in the third and fourth cycles corresponding to the first and second cycles 16a and 16b (step S32). Based on a second intermediate value of the second differences of the third and fourth microtick counts, the second node 4b corrects the second rate correction value (steps S34 to S40). Thereafter the second node 4b transmits the second frame 20b in the two cycles following the fourth cycle every time one rate correction operation ends (step S42).

In the same manner, the supervisory node 4c also corrects the third rate correction value in phase A. In other words, the supervisory node 4c measures the fifth and sixth microtick counts for the first to second frames 20a to 20c received in the fifth and sixth cycles corresponding to the first and second cycles 16a and 16b (step S32). Based on a third intermediate value of the third differences of the fifth and sixth microtick counts, the supervisory node 4c corrects the third rate correction value (steps S34 to S40). Thereafter the supervisory node 4c transmits the third frame 20c in the two cycles following the sixth cycle every time one rate correction operation ends (step S42).

By repeating this rate correction operation, the cycles of the plurality of nodes 4 synchronize with one another, and each cycle length converges to a constant value (see FIG. 8).

TABLE 4

Transition of cycle length after startup

| | First Node | Second Node | Supervisory Node |
|---|---|---|---|
| Cycle μT count at start of rate correction | 100,000 | 99,700 | 99,950 |
| Cycle μT count at convergence | 100,045 | 99,755 | 100,000 |
| Cycle length of start of rate correction (μs) | 10,000 | 10,000 | 10,000 |
| Cycle length at convergence (μs) | 10,004.5 | 10,005.5 | 10,005.0 |

Table 4 indicates the transition of the cycle length of each node after startup. The second row and the third row in Table 4 list an example of a cycle μT count of each node at the start of the rate correction and at convergence of the cycle length. In the fourth row and the fifth row in Table 4, the cycle length corresponding to these cycle μT counts are listed.

As the fifth row of Table 4 indicates, the cycle length at convergence of each node becomes closer to the center 44 (10,166 μs) of the initial value distribution of cycle lengths 43 (see FIG. 8) than the cycle length (10,000 μs) at the start of the rate correction indicated in the fourth row. However the difference between the center 44 of the initial value distribution of cycle lengths 43 and the cycle length at convergence of each node is large (e.g. 116 μs=10,166 μs−10,050 μs).

Figure 12:
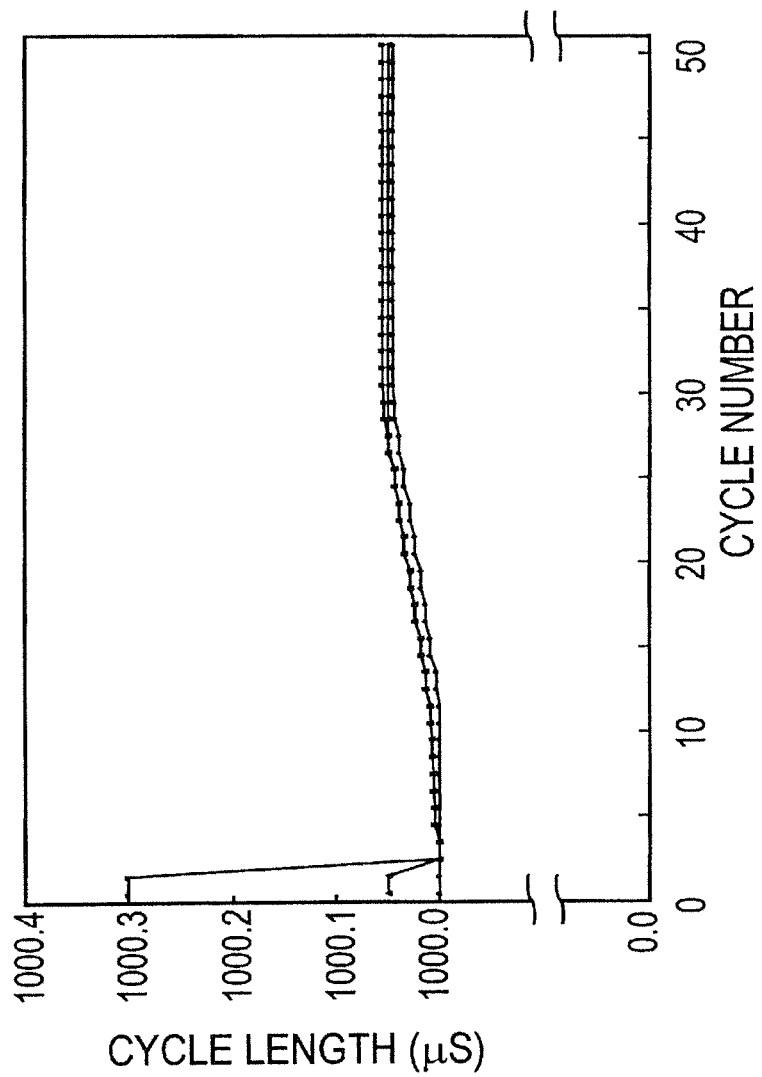
FIG. 12 is a graph depicting a simulation result of the cycle length listed in Table 4.

FIG. 12 is a graph depicting a simulation result of the cycle length listed in Table 4. The abscissa axis is the cycle number, and the ordinate axis is the cycle length. The initial value of the cycle μT count used for the simulation is 100,000 μT. The damping value is 5 μT. FIG. 12 clearly depicts the state where the cycle length of each node synchronize with one another and converge toward the center of the initial value distribution of cycle lengths.

The change of the cycle length in phase A in FIG. 8 is a schematic figure based on FIG. 12. As FIG. 8 depicts, there is a large difference 46 between the initial cycle length value 34b of the second node 4b and the converged value 42. In other words, the absolute value of the rate correction value (245 μT=100,000 μT−99,755 μT) of the second node 4b does not decrease even at convergence.

If the absolute value of the rate correction value is large like this, the rate correction value exceeds the rate correction limit value (e.g. 301 μT) by a slight disturbance, such as noise, and the second node 4b stops the transmission of the frame. This is because in the case of the rate correction operation in FIG. 10, each node attempts to converge the cycle length without considering the initial value distribution of the cycle lengths. However, it is difficult to detect the initial value distribution of the cycle lengths using the rate correction operation in FIG. 10. According to the embodiment 1, the supervisory node 4c measures the initial value distribution of the cycle lengths in phase B, and converges the cycle lengths of the first and second nodes 4a and 4b to be within a constant range, including the center of the initial value distribution of the cycle lengths, in phase C.

The first microtick count 24a (see FIG. 11) is a value that the first node 4a obtains by counting a number of microticks generated in a period from the start of the first cycle 16a to receiving the first bit of the second frame 20b, for example. Depending on the configuration of the transmission line 6, however, the first portion of the first frame 20a may be missed. In such a system, the first microtick count 24a may be determined by measuring a number of microticks generated from the start of the first cycle 16a to receiving a time reference point in the second frame 20b, and subtracting a certain offset value from this microtick count. This offset value is a microtick count generated during the period from when the second node 4b starts the transmission of the second frame 20b to when the second node 4b transmits the time reference point. This offset value is a global constant which is common to the plurality of nodes 4. This is the same for the second node 4b and the supervisory node 4c.

Figure 13:
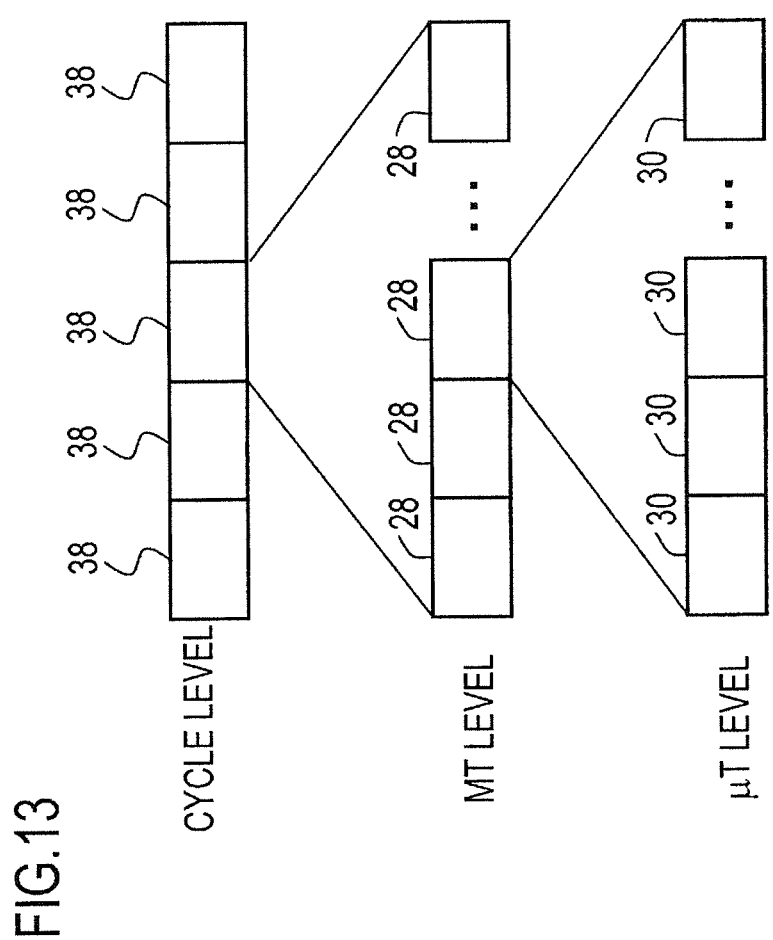
FIG. 13 is a diagram depicting a time configuration inside the node.

Each node of the embodiment 1 manages the transmission time of a frame using macroticks based on the cycle μT count. FIG. 13 is a diagram depicting a time configuration inside the node. As FIG. 13 illustrates, a macrotick 28 (hereafter called "MT") is a time unit in upper level higher than the microtick 30 (μT). A number of macroticks per cycle 38 (hereafter called "cycle MT count") is a global constant common to the plurality of nodes 4.

The μT count per MT is a value obtained by dividing a cycle μT count by a cycle MT count, and rounding up the result. Therefore the μT count per MT is a value which changes according to the cycle μT count.

Figure 14:
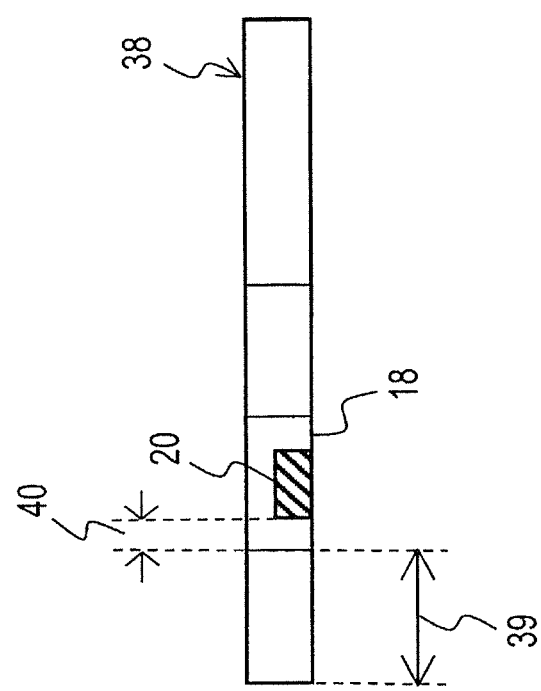
FIG. 14 is a diagram depicting a transmission time of a frame.

FIG. 14 is a diagram depicting a transmission time of a frame. The MT count 39 of each slot 18 from the cycle start is a global constant common to each node. Here the MT count 40 generated during the period from the start of the slot 18 to the transmission of the frame 20 (hereafter called "action point offset") is a global constant common to each node.

Therefore the frame 20 received by the slot 18 is expected to be received at a time when the time corresponding to the action point offset 40 is added to the start time of the slot 18 (hereafter called "slot action point").

In the first cycle 16a and the second cycle 16b, the μT count in the slot action point from the cycle start (a start of cycle) is the same. Hence the difference of the μT counts from the cycle start of the first to third frames, described with reference to FIG. 11, is the same as the difference of μT counts from the slot action point of the first to third frames. As a consequence, rate correction may be performed even if the slot action point is used as a reference.

—Phase B—

In phase B, the supervisory node 4c measures the initial value distribution of the cycle lengths. The supervisory node 4c monitors the change of the cycle length of each node during phase A, and advances to phase B when the supervisory node 4c determines that the cycle length of each node converged.

If each cycle length of the plurality of nodes 4 is within a range (e.g. 10,004.5 to 10,005.5 μS) having a certain width (e.g. damping value×2) for a certain number of times (e.g. five times) or more continuously, the supervisory node 4c determines that the cycle length of each node converged. In other words, it is determined that the cycle length of each node is converged when all the cycle lengths of the plurality of nodes 4 started to fluctuate within a range having a certain width.

The cycle length of the supervisory node 4c may be determined based on the rate correction value thereof (the third rate correction value) and the initial value of the cycle microtick count. In other words, the cycle length of the supervisory node 4c may be by adding the rate correction value to the initial cycle μT count value to determine the cycle μT count, converting the cycle μT count into time. The cycle length of the first node 4a, on the other hand, may be determined by the first and second microtick counts μT1 and μT2 for the first frame 20a, and the cycle μT count CμT of the supervisory node 4c. In other words, the cycle length of the first node 4a may be determined by determining the interval of the first frames 20a by substituting these values in the expression (CμT+μT2−μT1), and converting this interval value into time. The cycle length of the second node 4b may also be determined in the same manner.

Figure 15:
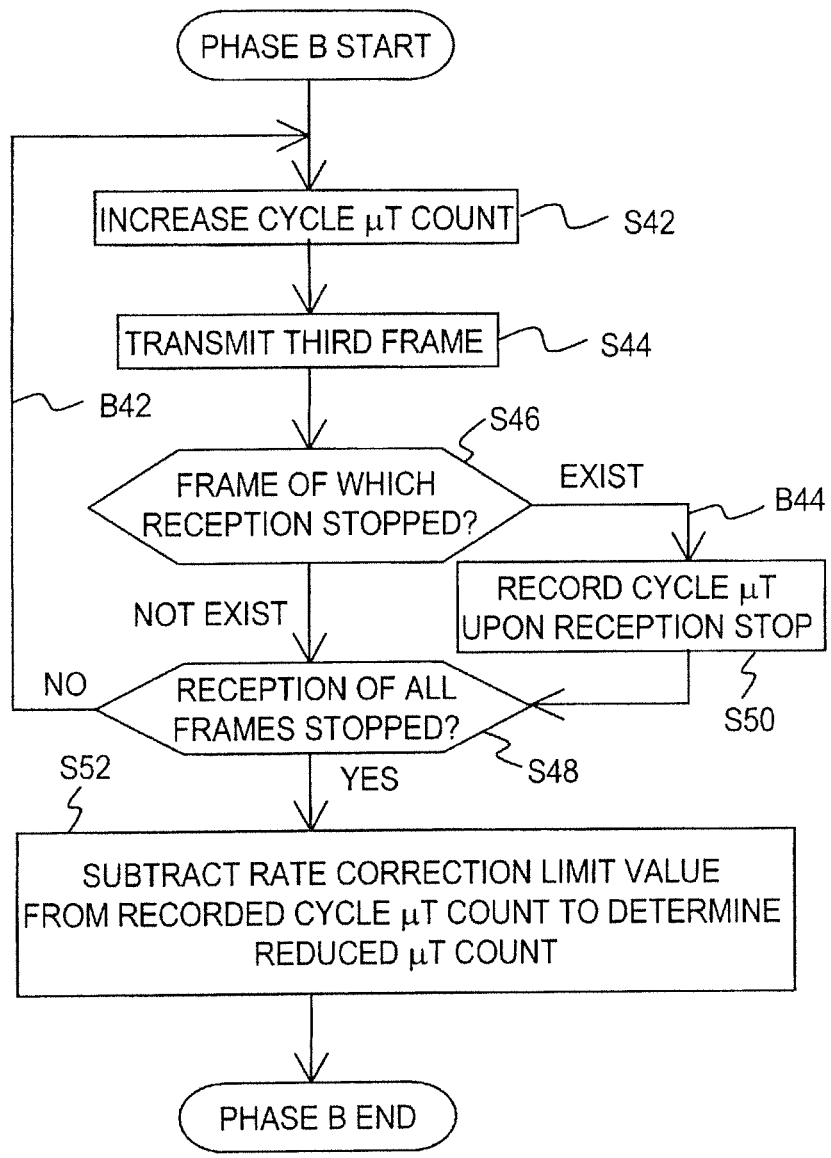
FIG. 15 is a flow chart depicting the operation of the supervisory node in phase B.

FIG. 15 is a flow chart depicting the operation of the supervisory node 4c in phase B.

The first and second nodes 4a and 4b perform the synchronization control described with reference to FIG. 5 continuously in phase B. When the processing advances to phase B, the supervisory node 4c transmits the third frame 20c in the third slot 18c while increasing the cycle μT count (S42→S44→B42→S42; step S16 in FIG. 7).

Then the first and second nodes 4a and 4b sequentially increase the respective rate correction values, responding to the increase of the microtick count of the third frame 20c from the start of the cycle. Based on the increased rate correction values, the first and second nodes 4a and 4b transmit the first and second frames 20a and 20b, and respectively stop transmission of the first and second frames 20a and 20b when each rate correction value exceeds the rate correction limit value (step S18 in FIG. 7).

As FIG. 15 indicates, the supervisory node 4c continues the transmission of the third frame 20c until the first and second nodes 4a and 4b stop transmission of the first and second frames (step S48). During this time, each time the first node 4a or the second node 4b stops, the supervisory node 4c records the cycle μT counts 48a and 48b (see FIG. 8) of the supervisory node 4c at this point in the third memory 32c of the memory 12a (S46+B44+S50).

If the first and second nodes 4a and 4b stop, the supervisory node 4c reads the cycle μT counts of the supervisory node 4c when reception of the first and second frames 20a and 20b is stopped, from the third memory area 32c. The supervisory node 4c determines a plurality of reduced cycle microtick counts (hereafter called "reduced cycle μT count(s)") obtained by subtracting the rate correction limit value from the read cycle μT count, and records them in the fourth memory area 32d (step S52 in FIG. 15; step S20 in FIG. 7).

The first and second nodes 4a and 4b increase the cycle lengths following up the supervisory node 4c. As a result, the cycle μT count of the supervisory node 4c, when the first and second frames 20a and 20b stopped, is the cycle length when the frame transmission of the first and second nodes 4a and 4b stopped, that is measured in time units (that is microticks) of the supervisory node 4c. This means that the reduced cycle μT count is time when the initial cycle length values of the first and second nodes 4a and 4b are measured in time units (microticks) of the supervisory node 4c. In other words, the initial value distribution of the cycle lengths may be measured according to the supervisory node 4c. It is preferable that the increase of the cycle μT count is the damping value or less. This is because the difference of cycle lengths between the first and second nodes 4a and 4b and the supervisory node 4c increases if the increase of the cycle μT count is too much.

In the above example, the supervisory node 4c transmits the third frame 20c in the third slot 18c while increasing the cycle μT count. However the supervisory node 4c may transmit the third frame 20c in the third slot 18c while decreasing the cycle μT count. In this case, the supervisory node 4c determines the reduced cycle μT count by adding the rate correction limit value to the cycle μT count of the supervisory node 4c when the reception of the first and second frames 20a and 20b stopped.

—Phase C—

Figure 16:
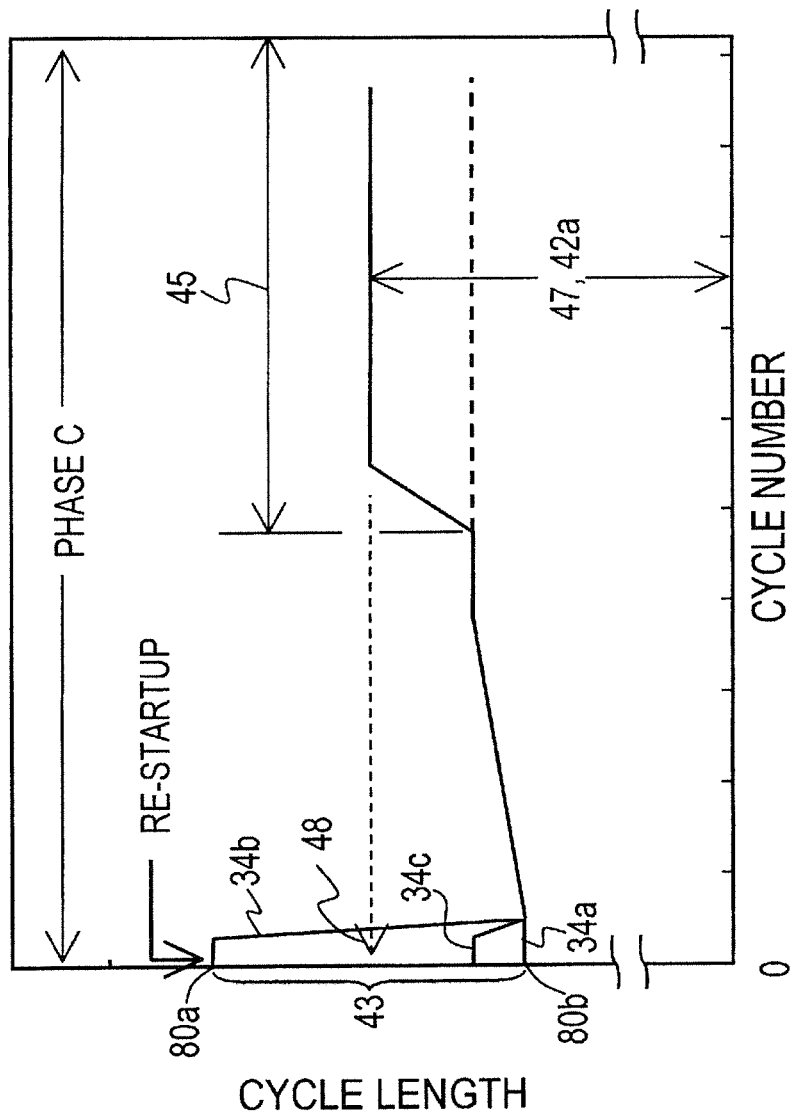
FIG. 16 is a diagram depicting the change of the cycle length of each node in phase C of the embodiment 1.
Figure 17:
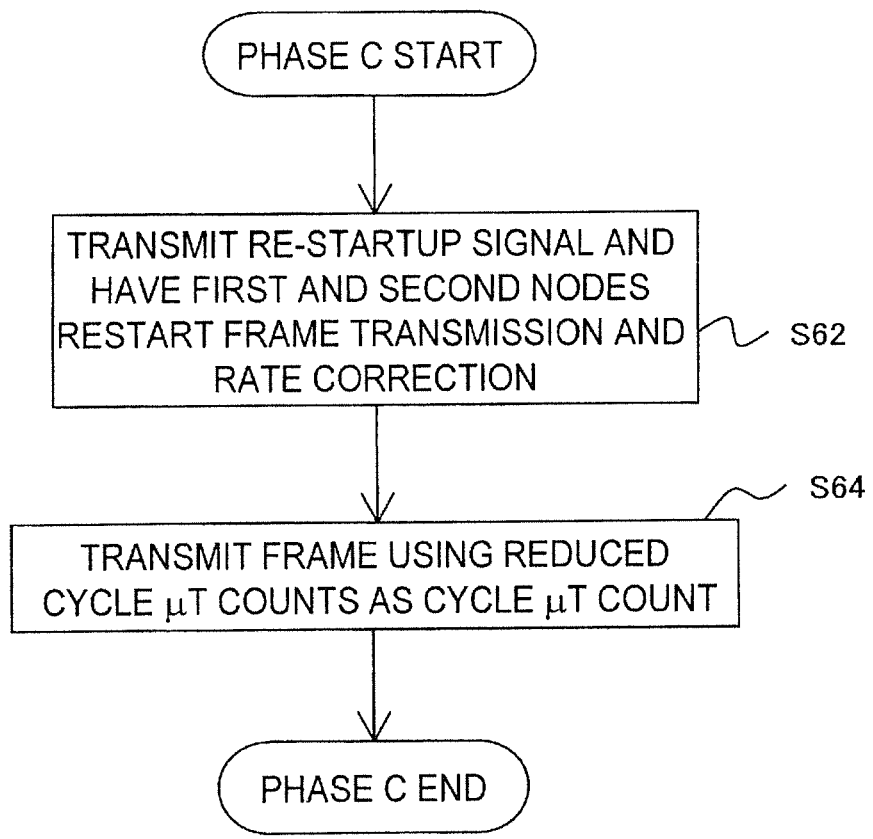
FIG. 17 is a flow chart depicting the operation in phase C of the supervisory node of the embodiment 1.

In phase C, the supervisory node 4c converges the cycle lengths of the first and second nodes 4a and 4b to a center area of the initial value distribution of the cycle lengths. FIG. 16 is a diagram depicting the change of the cycle length of each node in phase C. The abscissa axis is a cycle number after restart, and the ordinate axis is a cycle length. FIG. 17 is a flow chart depicting the operation in phase C of the supervisory node 4c.

When the reception of the first and second frames 20a and 20b stops, the supervisory node 4c stops transmission of the third frame 20c once. Then the supervisory node 4c sets the initial value 0 μT of the rate correction value again in the second memory area 32b. Then the supervisory node 4c reads the reduced cycle μT counts recorded in the third memory area 32c, and determines an intermediate value of the reduced cycle μT counts (a value between the maximum value and the minimum value). The supervisory node 4c records the determined intermediate value in the fourth memory area 32d of the memory 12a (that is, the intermediate value is set as the cycle μT count). This intermediate value is a value obtained by rounding up or rounding off the mean value of the reduced cycle μT counts, for example. The intermediate value may be a fault-tolerant mid-point of the reduced cycle μT counts, as mentioned later.

Then the supervisory node 4c transmits a re-start signal, and enters a ready state. "Ready state" refers to a state of starting startup process responding to a startup frame. The second node 4b enters the ready state responding to a re-startup signal transmitted by the supervisory node 4c.

The first node 4a, on the other hand, transmits the first frame 20a in the continuous four cycles as the startup frame, responding to the re-startup signal (that is, the startup processing is restarted). Then the first node 4a restarts the rate correction, and transmits the first frame 20a (startup frame) in the first slot 18a.

Responding to the startup frame transmitted by the first node 4a, the second node 4b and the supervisory node 4c execute the startup processing. Then the second node 4b and the supervisory node 4c restart the rate correction, and transmit the second frame 20b and the third frame 20c in the second slot 18b and the third slot 18c respectively.

In other words, the supervisory node 4c has the first and second nodes, which stopped transmission of the first and second frames, restart transmission of the first and second frames and correction of the first and second rate correction values respectively (S62 in FIG. 17).

Then the supervisory node 4c monitors the change of the rate correction value (third rate correction value) and sequentially determines whether the cycle lengths of the first and second nodes 4a and 4b converged. If it is determined that the cycle lengths of the first and second nodes 4a and 4b converged, the supervisory node 4c sets a intermediate value of the reduced cycle μT counts recorded in the fourth memory area 32d as the cycle μT count.

Then based on the intermediate value of the reduced cycle μT counts, which are set as the cycle μT counts, the supervisory node 4c repeatedly transmits the third frame 20c in the third slot 18c (S64, S22 in FIG. 7). For example, the intermediate value of the reduced cycle μT counts is a value obtained by rounding up or rounding off the mean value of the reduced cycle μT counts. Therefore the cycle length of the supervisory node 4c is set to a value around the center 48 of the cycle length distribution 43 (see FIG. 16).

As the period 45 in FIG. 16 indicates, the first and second nodes 4a and 4b, in response to the third frame 20c, converge the respective cycle lengths 34a and 34b to the cycle lengths 34c and 47 of the supervisory node 4c (that is, the center 48 of the cycle length distribution 43) (S 24 in FIG. 7). Therefore the interval of the initial cycle length values 80a and 80b of the first and second nodes 4a and 4b and the converged value 42a decreases, and the occurrence of step-out of the first and second nodes 4a and 4b is less likely.

In the above example, the intermediate value or fault-tolerant mid-point of the reduced microtick count is a mean value of the reduced microtick counts. However the intermediate value may be a value obtained by rounding up or rounding off a mean value of a maximum value and minimum value of the reduced cycle μT counts. Or the intermediate value may be a value between the maximum value and the minimum value of the reduced cycle μT counts remaining after deleting a certain number of data (>1) from the maximum value and the minimum value of the reduced cycle μT counts according to the number of the reduced cycle μT count (>4).

As described with reference to FIG. 2, the first and second nodes 4a and 4b have a computer 7 respectively. These computers 7 generate information for controlling the external devices respectively. After the transmission of the first and second frames is restarted, the first and second nodes 4a and 4b transmit the generated information using the payload segments of the first and second frames 20a and 20b (S24 in FIG. 7). The computer of the supervisory node 4c, on the other hand, does not generate such information. In other words, the supervisory node 4c of the embodiment 1 is a dedicated device which measures the initial distribution of the cycle lengths, and controls the cycle lengths of the first and second nodes 4a and 4b.

However the computer 7 of the supervisory node 4c may also generate information, and transmit this information after restart of the transmission of the first and second frames 20a and 20b to the first and second nodes 4a and 4b. In this case, the supervisory node 4c may transmit the information generated by the computer 7 using the fourth frame, which is transmitted in the fourth slot.

Embodiment 2

A node system of the embodiment 2 has an approximately same configuration as the node system of Embodiment 1. Hence description on the portions common with Embodiment 1 will be omitted. The operation of the present supervisory node in phase C, however, is different from the supervisory node of Embodiment 1.

Figure 18:
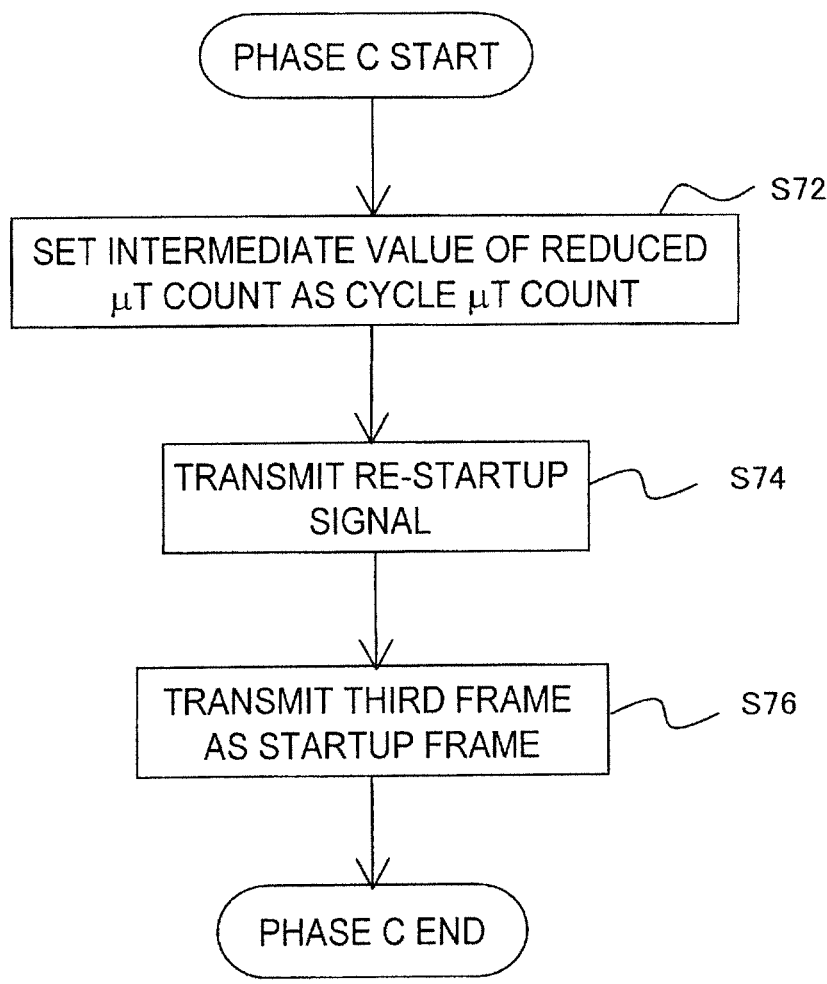
FIG. 18 is a flow chart depicting the operation of the supervisory node of an embodiment 2 in phase C.
Figure 19:
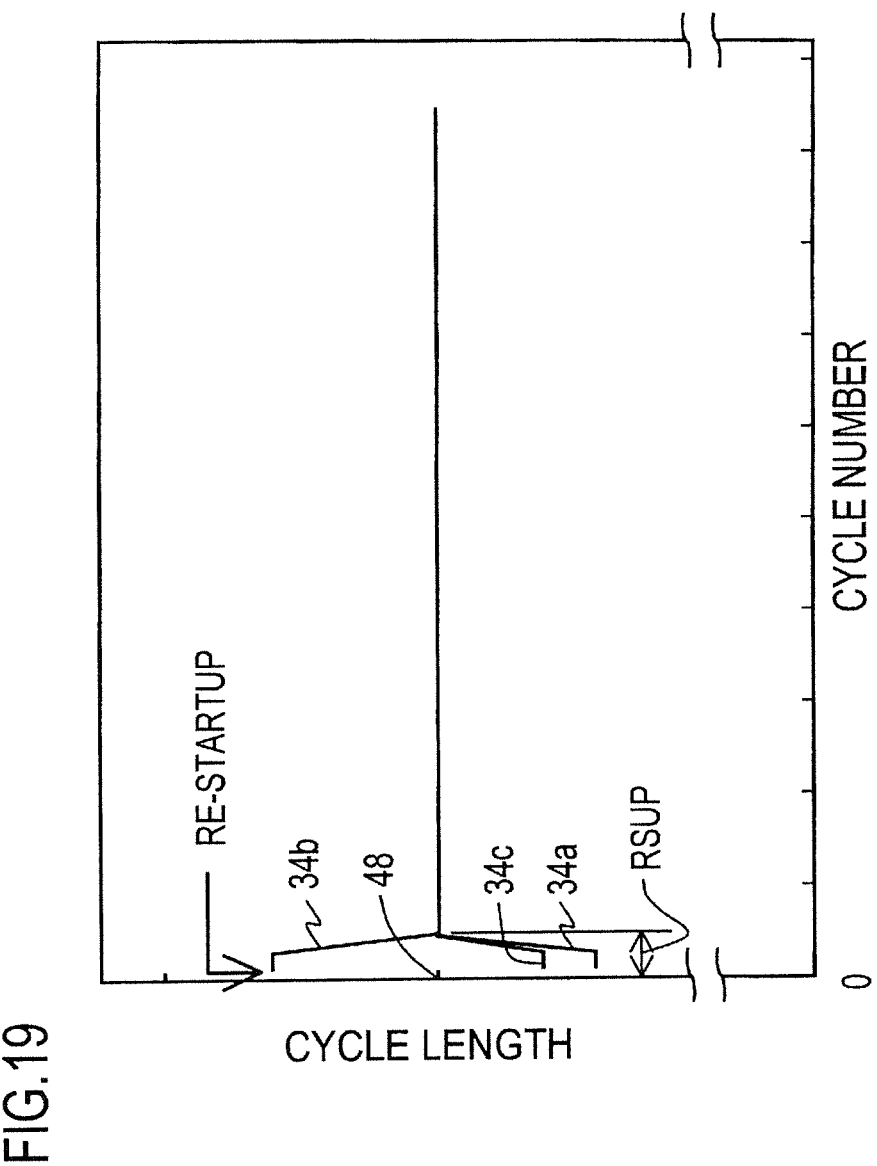
FIG. 19 is a diagram depicting a change of the cycle length of each node in phase C of the embodiment.

FIG. 18 is a flow chart depicting the operation of the present supervisory node in phase C. FIG. 19 is a diagram depicting a change of the cycle length of each node in phase C of the embodiment 2.

In this node system, each node executes the operation in phase A and phase B described in Embodiment 1. Then this supervisory node pauses the transmission of the third frame.

Then this supervisory node reads the reduced cycle μT counts recorded in the third memory area 32c, and determines a intermediate value thereof. Then the supervisory node 4c sets the determined intermediate value in the fourth memory area 32d of the memory 12a as the cycle μT count (S72).

This supervisory node also transmits a restartup signal (S74). Then the supervisory node sets the third frame as a startup frame, and transmits the third frame 20c in the third slot 18c (S76).

Responding to the startup signal and the startup frame transmitted by the supervisory node 4c, the first and second nodes 4a and 4b set the respective rate correction values (first and second rate correction values) so that the respective cycle length matches the cycle length of the supervisory node (see the restartup period RSUP in FIG. 19).

Then the first and second nodes 4a and 4b restart the transmission of the first and second frames 20a and 20b and correction of the first and second rate correction values.

Therefore as FIG. 19 depicts, the cycle lengths of the first and second nodes 4a and 4b converge around the center 48 of the cycle length distribution immediately after the restartup period RSU.

Embodiment 3

A node system of the embodiment 3 has approximately the same configuration as the node system of Embodiment 1. Hence description on portions that are common with Embodiment 1 will be omitted. The operation of the present supervisory node in phase B is different in part from the supervisory node of Embodiment 1.

Figure 20:
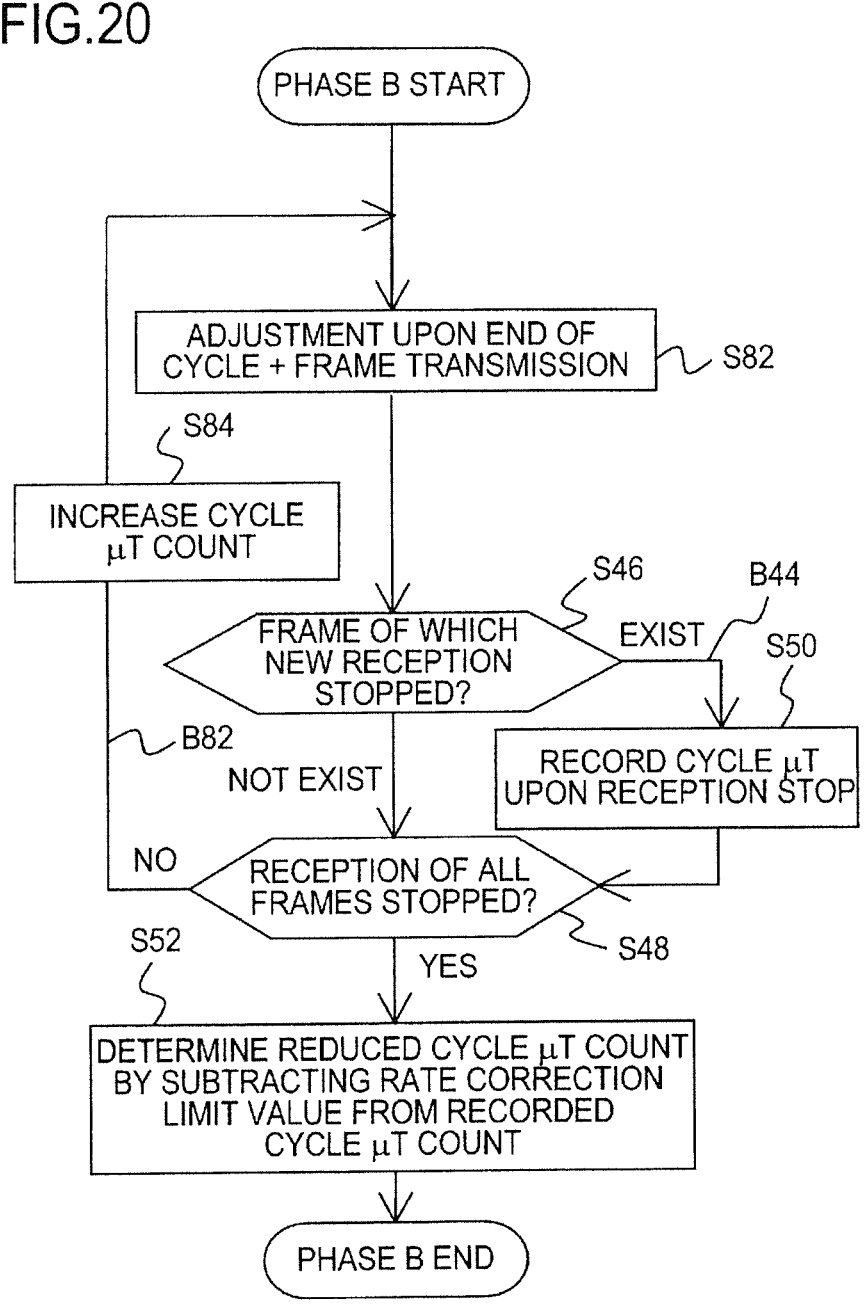
FIG. 20 is a flow chart depicting the operation of the supervisory node of an embodiment 3 in phase B.

FIG. 20 is a flow chart depicting the operation of the supervisory node of the embodiment 3 in phase B. Steps in which the same processing as Embodiment 1 is performed are denoted with the same reference symbols as those in FIG. 15.

Just like the supervisory node of Embodiment 1, this supervisory node monitors the cycle length of each node during phase A, and advances to phase B when the supervisory node determines that the cycle length of each node converges. The operation of the first and second nodes in phase B is approximately the same as that of the first and second nodes 4a and 4b of Embodiment 1.

As FIG. 20 depicts, operation of this supervisory node in phase B is also approximately the same as the supervisory node of Embodiment 1. This supervisory node, however, transmits the third frame while adjusting the end time of the cycle (S82), and then increases the cycle μT count (S84).

Figure 21:
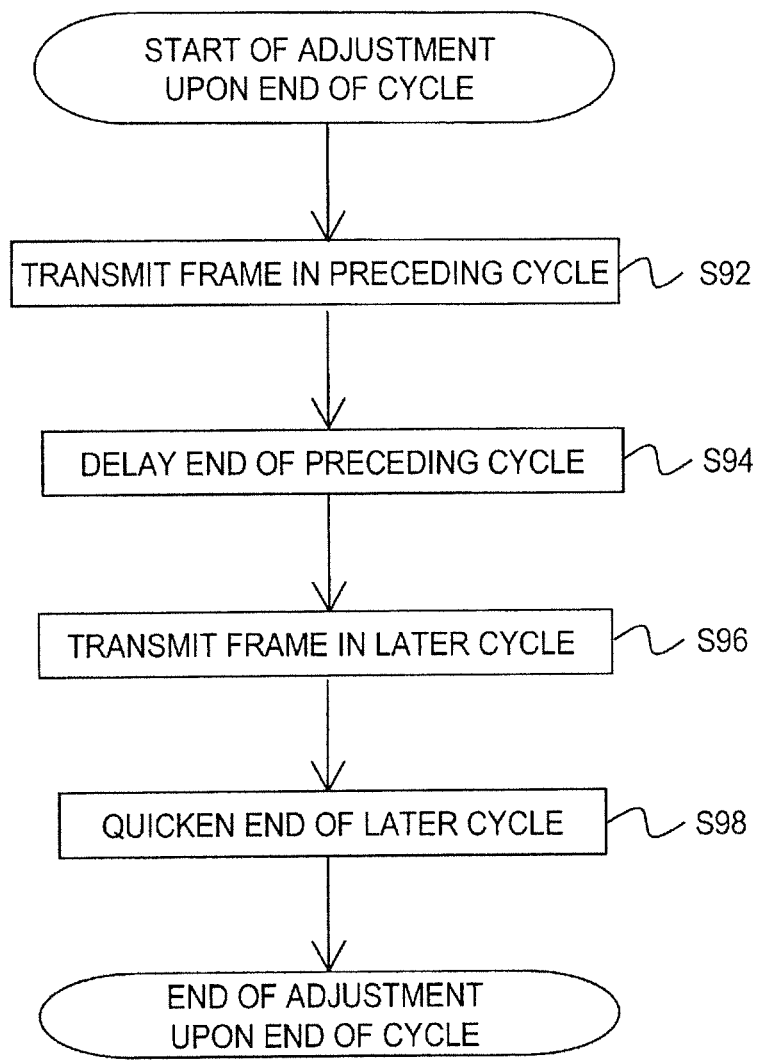
FIG. 21 is a flow chart depicting the method for adjusting the end time of a cycle.
Figure 22:
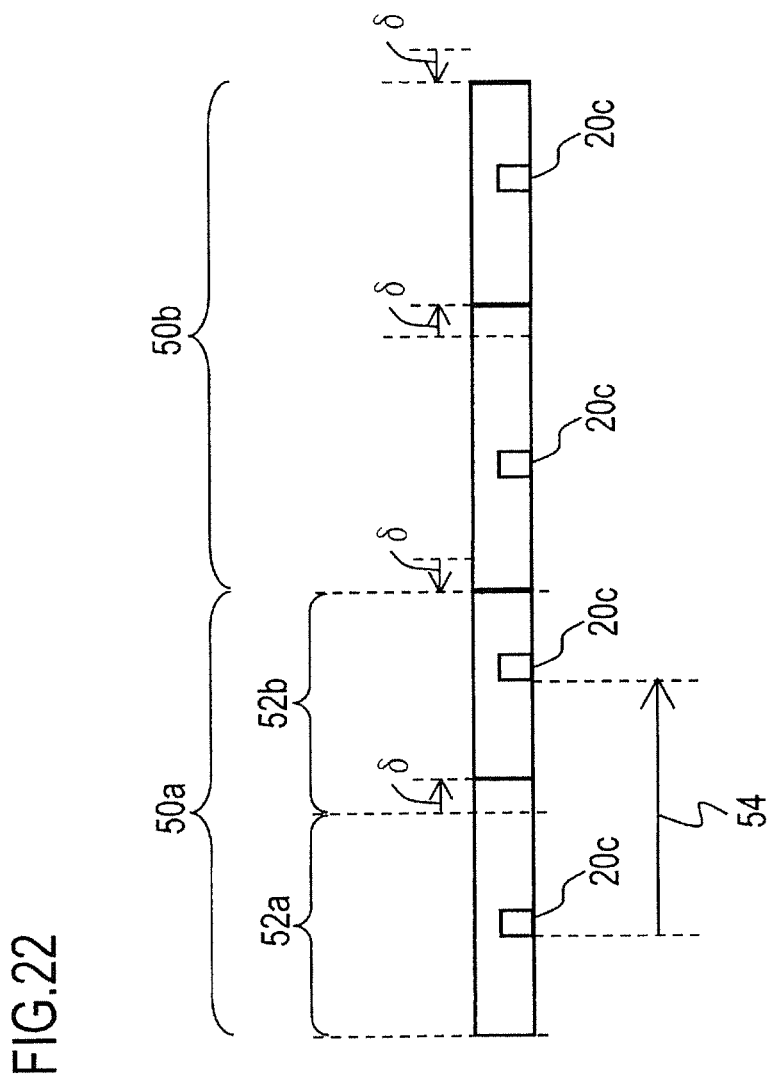
FIG. 22 is a time chart depicting the method for adjusting the end time of the cycle.

FIG. 21 is a flow chart depicting the method for adjusting the end time of the cycle (step S82). FIG. 22 is a time chart depicting the method for adjusting the end time of the cycle.

As FIG. 22 illustrates, this supervisory node transmits the third frame 20c in the third slot (not illustrated) of the preceding cycle 52a of the first cycle pair 50a (a pair of continuous cycles) (step S92). Then this supervisory node delays end of the preceding cycle 52a by a certain number of microticks 8 (step S94).

Then this supervisory node transmits the third frame 20c in the third slot of the later cycle 52b of the first cycle pair 50a (step S96). Then this supervisory node advances (put forward) the end of the later cycle 52b by the above mentioned number of microticks δ (step S98).

If reception of the first frame 20a or second frame 20b is not stopped, the supervisory node increases the cycle μT count, and transmits the third frame in the second cycle pair 50b following the first cycle pair 50a (S48→B82→S84→S82 in FIG. 20). If reception of the first frame 20c and the second frame 20b is completely stopped, the supervisory node stops transmission of the third frame, and determines the reduced cycle μT count (step S52 in FIG. 20).

As FIG. 22 depicts, if the end time of the preceding cycle 52a is delayed by δ, the transmission interval 54 of the third frame 20c increases by δ. Therefore this looks as if the cycle length of the supervisory node increased by δ to the first and second nodes. Hence according to the embodiment 3, the cycle length of the supervisory node may be virtually increased.

Figure 23:
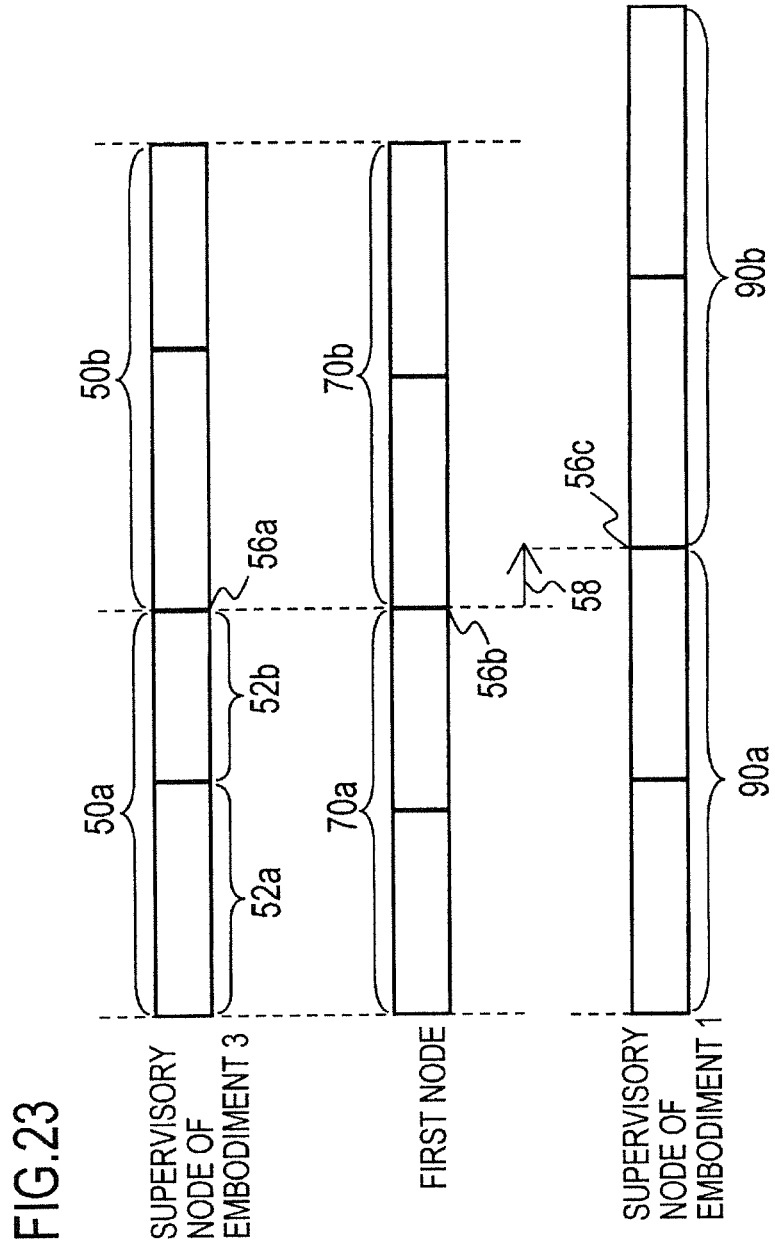
FIG. 23 is a time chart comparing the change of the cycle between the supervisory node of the embodiment 3 and the supervisory node of the embodiment 1.

FIG. 23 is a time chart comparing the change of the cycle between the supervisory node of the embodiment 3 and the supervisory node of Embodiment 1. The time-based change of the cycle of the first node 4a is depicted in the mid-level of FIG. 23. The time-based change of the cycle of this supervisory node is depicted in the top level of FIG. 23. And the time-based change of the cycle of the supervisory node of Embodiment 1 is depicted in the bottom level of FIG. 23. The cycle in FIG. 23 is a cycle immediately after the transition to phase B.

As mentioned above, this supervisory node delays the end point of the preceding cycle 52a by δ, then advances the end point of the following cycle 52b by δ. Therefore the end point 56a of the cycle pair 50a of this supervisory node is approximately the same as the end point 56b of the cycle pair 70a of the first node 4a.

After entering phase B, the supervisory node of Embodiment 1 increases the cycle μT count first, and transmits the third frame. Therefore as FIG. 23 depicts, the end point 56c of the cycle pair 90a of the supervisory node of Embodiment 1 becomes later than the end point 56b of the cycle pair 70a of the first node. Hence a time difference 58 is generated between the end point 56c of the cycle pair 90a of the supervisory node of Embodiment 1 and the end point 56c of the cycle pair 70a of the first node 4a.

As this time difference 58 increases, various problems occur. As FIG. 23 illustrates, the second cycle pair 90b of the supervisory node of Embodiment 1 starts later than the second cycle pair 70b of the first node 4a. If the time difference 58 becomes too large, the third frame 20c, which the supervisory node of Embodiment 1 transmits in the cycle pair 90b, extends out of the third slot 18c of the first node 4a, and a communication error occurs.

Figure 24:
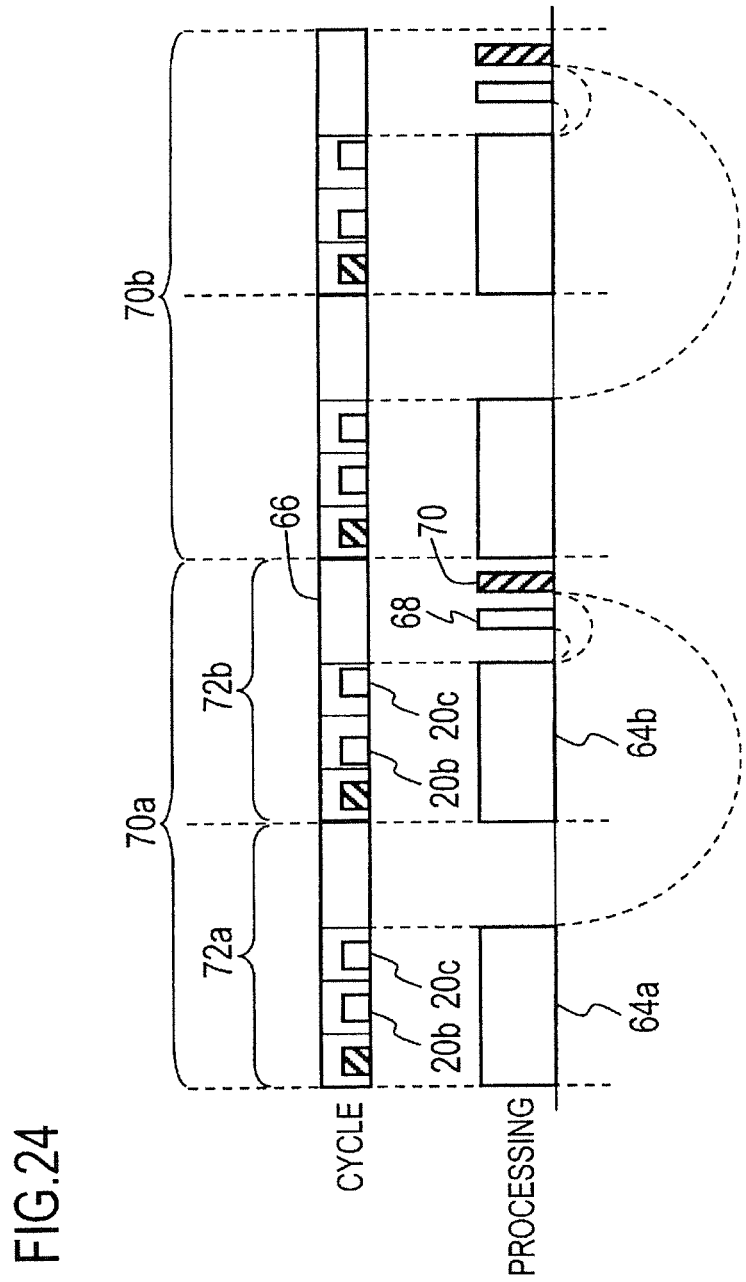
FIG. 24 is a time chart depicting the offset correction.

In addition to this problem, if the first node 4a performs offset correction, offset errors more easily occur due to the increase of the time difference 58. FIG. 24 is a time chart depicting the offset correction. The top level in FIG. 24 illustrates the time-based change of the cycle of the first node 4a. The bottom level in FIG. 24 illustrates the time series of the processing performed by the first node 4a.

To perform offset correction, it is preferable to measure an μT count from a slot action point (expected reception timing) to the actual reception of the frame (hereafter called "deviation"). Based on the deviation of the μT count, offset correction and rate correction are performed.

As FIG. 24 illustrates, the first node 4a measures first deviations for the second frame 20b and the third frame 20c respectively (that is, measures two deviations) in the first measurement period 64a in the preceding cycle 72a of the first cycle pair 70a.

In the same manner, the first node 4a measures second deviations for the second frame 20b and the third frame 20c respectively (that is, measures two deviations) in the second measurement period 64b in the later cycle 72b of the first cycle pair 70a.

Then based on the first and second deviations, the first node 4a corrects a first rate correction value in a first operation period 68, which is set in a network idle time 66 in the later cycle 72b of the first cycle pair 70a. Based on the corrected first rate correction value, the first node 4a sets a cycle μT count of the second cycle pair 70b which following the first cycle pair 70a. The network idle time is a last period in a cycle, where a slot is not assigned.

The first node 4a determines a intermediate value of the second deviations in the second operation period 70 of the network idle time 66 in the later cycle 72b, and sets this intermediate value as the offset correction value. Then the first node 4a delays the end time of the later cycle 72b by the amount of the offset correction value. This offset correction functions so that the end point of the first cycle pair 70a becomes close to the end point of the cycle pair of the second node 4b and that of the supervisory node 4c. The second node 4b also performs the offset correction in the same manner as the first node 4a.

If the absolute value of the offset correction value becomes too large (especially when the offset correction value is negative), problems occur in the operation processing performed during the network idle time. Therefore if the absolute value of the offset correction value exceeds the offset correction limit value, the count value of the error counter increments by one, and the first node 4a stops transmission of a frame when the count value exceeds a threshold. Hereafter the offset correction value exceeding the offset correction limit value is called an "offset error".

As described in Embodiment 1, in the case of the supervisory node simply increasing the cycle μT count, the end point 56c of the first cycle pair 90a of the supervisory node delays from the end point 56b of the first cycle pair 70a of the first node 4a (see FIG. 23). Therefore the deviation of the third frame 20c in the cycle pair 70b following the cycle pair 70a of the first node 4a increases, and an offset error tends to occur easily in the first node 4a. An offset error tends to occur easily in the second node 4b as well.

According to the embodiment 3 however, as illustrated in FIG. 23, the end point 56a of the cycle pair 50a of the supervisory node and the end point 56b of the cycle pair 70a of the first node 4a become approximately the same, so an offset error hardly occurs. Hence the transmission of a frame of the first node 4a is not stopped so easily. The transmission of a frame of the second node 4b is not stopped so easily either in the same manner.

It is preferable that the increase of the cycle μT count by the supervisory node is ½ of δ. In this case, the increase of the cycle count of the first node 4a and that of the second node 4b becomes approximately the same as the increase of the cycle μT count of the supervisory node, and the end points may be more easily aligned even in the cycle pairs after the initial cycle pairs 50a and 70a. It is preferable that the μT count δ for adjusting the end point of the cycle is the damping value or less. Then the measurement error of the cycle length distribution decreases.

In the above example, the end of the preceding cycle 52a is delayed by a μT count δ, and the end of the later cycle 52b is advanced by the same μT count δ. However the end of the preceding cycle 52a may be advanced by an μT count δ, and the end of the later cycle 52b may be delayed by the μT count δ. In this case, the cycle μT count for the second cycle pair 50b following the first cycle pair 50a is decreased Embodiment 4

A node system of the embodiment 4 has approximately the same configuration as the node system of Embodiment 1. Hence description on the portions that are common with Embodiment 1 will be omitted.

Figure 25:
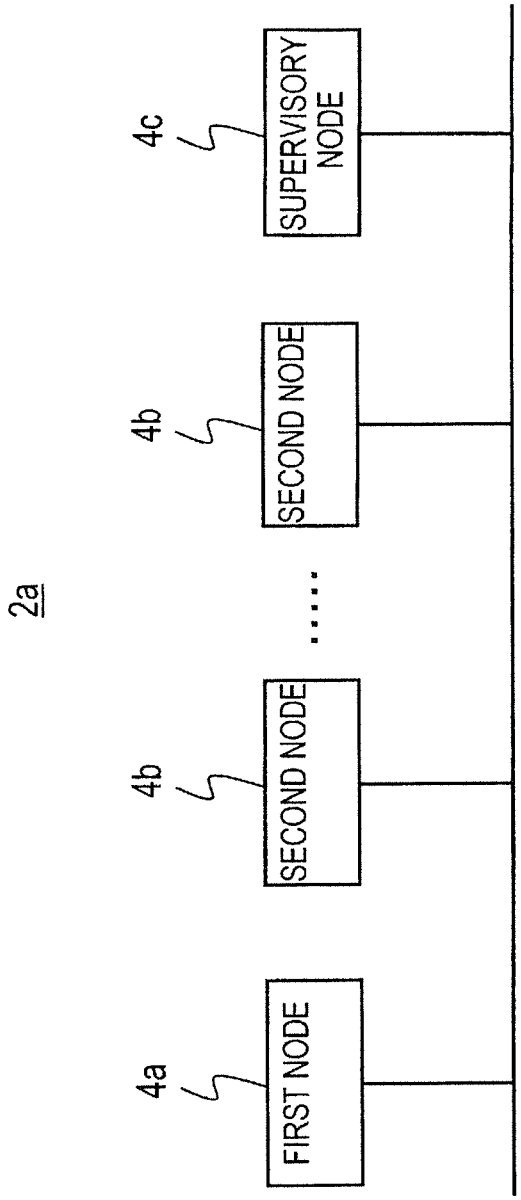
FIG. 25 is a diagram depicting a configuration of a node system of an embodiment 4.

FIG. 25 is a diagram depicting a configuration of a node system 2a according to the embodiment 4. As FIG. 25 illustrates, this node system 2a has a plurality of second nodes 4b. In other words, this node system 2a has four or more nodes. Just like Embodiment 1, each node included in this node system measures differences of the microtick counts from the start of the cycle for a plurality of received frames, and performs rate correction based on an intermediate value of the differences. Hence each node of this node system 2 determines an intermediate value of the differences of three or more microtick counts.

In the case of determining a intermediate value of three or more data like this, errors in the processing target data may be suppressed by using a fault-tolerant mid-point algorithm (hereafter called "FTM algorithm").

Figure 26:
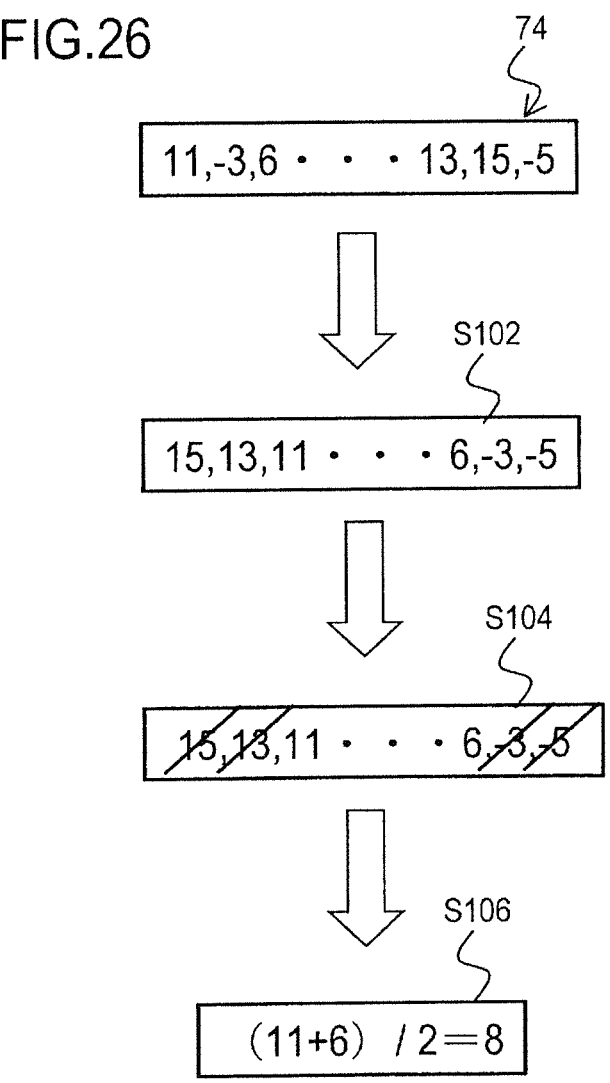
FIG. 26 is a diagram depicting the FTM algorithm.

FIG. 26 is a diagram depicting the FTM algorithm. In the FTM algorithm, the processing target data 74 is sorted in order of size (S102). Then according to the number of processing target data, a certain number of data k (e.g. 2) is deleted sequentially from the maximum value and the minimum value of the sorted data (S104). The maximum value and the minimum value of the remaining data are averaged, and the intermediate value is determined by rounding up or rounding off the obtained mean value (S106).

TABLE 5

Number of data to be deleted in FTM algorithm

| Data Count | k |
|---|---|
| 1-2 | 0 |
| 3-7 | 1 |
| >7 | 2 |

Table 5 is an example of a number of data k to be deleted, which is used for the FTM algorithm. The left column is a number of processing target data. The right column is a number of data k to be deleted. As Table 5 indicates, a number of data k to be deleted is one or more if a number of processing target data is three or more. A number of data k to be deleted is 0 if a number of processing target data is two or less.

Now a procedure for the first node 4a to determine an intermediate value of the rate correction using the FTM algorithm will be described. Here it is assumed that the second node 4b has two nodes, node A and node B. It is also assumed that each node of this node system does not receive a frame which the node itself transmitted.

Figure 27:
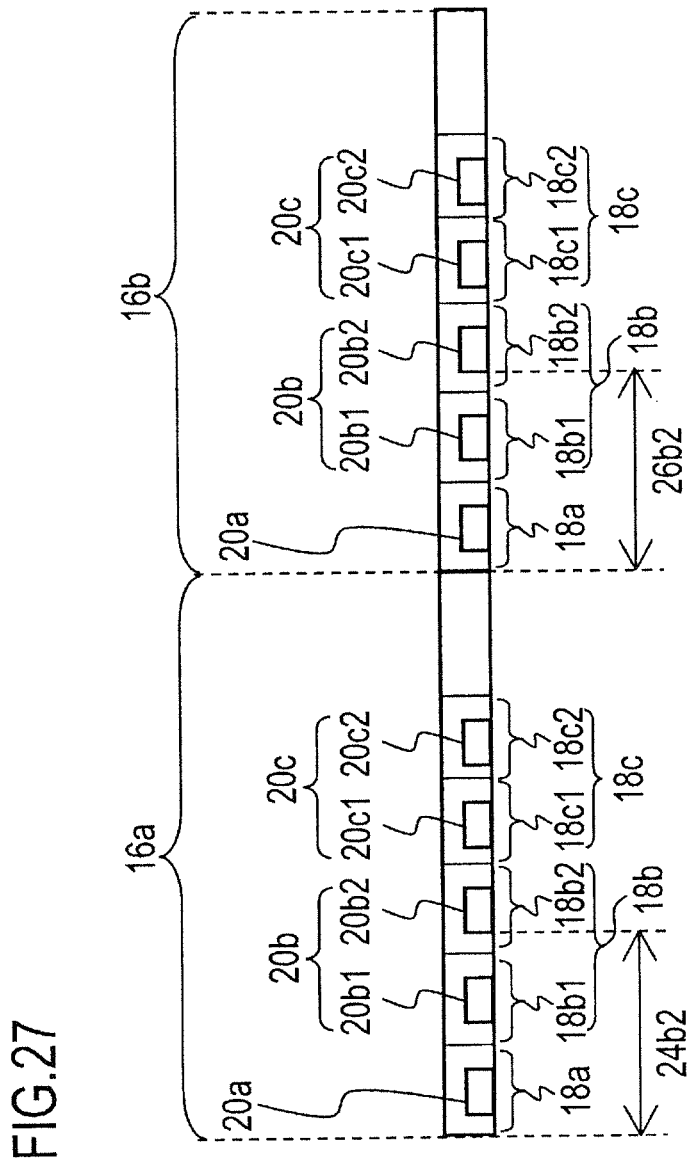
FIG. 27 is a time chart depicting the rate correction procedure in the first node.

FIG. 27 is a time chart depicting the rate correction procedure in the first node 4a. As FIG. 27 illustrates, the node A and node B (second node 4b) transmit a frame 20b1 and a frame 20b2 (second frame 20b) respectively in the slots 18b1 and 18b2 (second slot 18b) assigned to each frame. This supervisory node 4c, on the other hand, transmits a frame 20c1 and a frame 20c2 (third frame 20c) in the slot 18c1 and slot 18c2 (third slot 18c).

The first node 4a measures a first microtick count (e.g. microtick count 24b2) from the start of the cycle for each frame 20b1 to 20c2 received in the first cycle 16a. In the same manner, the first node 4a measures a second microtick count (e.g. microtick count 26b2) from the start of the cycle for each frame 20b1 to 20c2 received in the second cycle 16b following the first cycle 16a. The first node 4a also determines the difference between the first microtick count and the second microtick count.

Then the first node 4a deletes a certain number (e.g. 1) of data for the differences according to a number of the data (e.g. 4) sequentially from the maximum value to the minimum value of the differences (see Table 5). Then the first node 4a deletes the certain number (e.g. 1) of data sequentially from the minimum value to the maximum value. Then the first node 4a averages the maximum value and the minimum value of the remaining difference values, and determines the fault-tolerant mid-point by rounding up or rounding off the obtained mean value. Using this fault-tolerant mid-point, the first node 4a corrects the first rate correction value. The second node 4b also determines a fault-tolerant mid-point, just like the first node 4a, and corrects the second rate correction value.

As described above, if rate correction is performed based on the fault-tolerant mid-point, a frame transmitted by a node having the longest cycle length (and node having the shortest cycle length) is ignored. The cycle length of the supervisory node 4c tends to be longer (or shorter) than that of the first and second nodes 4a and 4b. Particularly in phase B, this state is generated with certainty. As a consequence, the supervisory node 4c of the embodiment 4 transmits more third frames than the number of data k to be deleted from the maximum value and the minimum value based on the FTM algorithm.

As FIG. 25 illustrates, a number of nodes of this node system 2a is four or more. Hence as FIG. 27 illustrates, this supervisory node 4c transmits two or more third frames 20c. In other words, the supervisory node 4c transmits a plurality of third frames 20c in a plurality of third slots 18c.

In the example in FIG. 27, a number of frames which the first and second nodes receive is 4 (=5−1) respectively. This means that a number of data to be deleted from the maximum value and the minimum value based on the FTM algorithm is 1 (see Table 5). Therefore in FIG. 27, this supervisory node 4c transmits two frames 20c1 and 20c2.

TABLE 6

Number of frames transmitted by supervisory node

| Number of received frames | Number of frames transmitted by supervisory node |
|---|---|
| 1-2 | 1 |
| 3-7 | 2 |
| >7 | 3 |

Table 6 is an example of a number of frames which this supervisory node 4c transmits. The left column of Table 6 lists a total number of frames received by each node. The right column of Table 6 lists a number of frames the supervisory node transmits. The node system 2 of Embodiment 1 has three nodes, as indicated in FIG. 1. Therefore in the case of using the FTM algorithm for the node system 2 of Embodiment 1 as well, it is preferable to transmit a plurality of third frames 20c in a plurality of third slots 18c, as indicated in Table 6.

The intermediate value of the reduced cycle μT counts may also be determined by the FTM algorithm. The supervisory node first deletes a certain number of data (1 or more) according to a number of data of a plurality of reduced cycle μT counts (3 or more) sequentially from the maximum value to the minimum value of the plurality of reduced cycle μT counts. Then the supervisory node deletes the certain number of data sequentially from the minimum value to the maximum value of the reduced cycle μT counts, and determines the intermediate value by rounding up or rounding off the mean value of the maximum value and the minimum value of the remaining reduced cycle μT counts. Thereby errors included in the reduce cycle μT counts are eliminated.

In the above embodiment, each node transits to phase B after the respective cycle length converges. However each node may omit synchronization control of phase A (S14a to S14c in FIG. 7), and transmits to phase B immediately after startup. In this case, the supervisory node 4c transmits the third frame in the third slot while increasing or decreasing the cycle μT count from the beginning.

In the above embodiment, frames of all the nodes included in the node system are used for synchronization control. However this node system may have a node which transmits frames that are not used for synchronization control. In this case, each node determines whether or not a frame to be received is a frame to be used for synchronization control by a certain indicator in the header segment.

In the above embodiment, a single transmission line 6 is used. The transmission line 6 however may be duplex.

In the above embodiment, the topology of the transmission line 6 is a bus type. The topology of the transmission line 6 however may be a star type, or a combination of a bus type and a star type.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A node system having a plurality of nodes, comprising:
  a first node configured to:
    correct a first rate correction value such that one or more cycles of the plurality of nodes synchronize,
    transmit a first frame based on the corrected first rate correction value when an absolute value of the first rate correction value is within a threshold, and
    stop transmission of the first frame when the absolute value of the first rate correction value exceeds the threshold;
  a second node configured to:
    correct a second rate correction value such that one or more cycles of the plurality of nodes synchronize,
    transmit a second frame based on the corrected second rate correction value when an absolute value of the second rate correction value is within the threshold, and
    stop transmission of the second frame when the absolute value of the second rate correction value exceeds the threshold; and
  a third node configured to:
    transmit a third frame while increasing or decreasing a clock cycle count, and
    determine a reduced clock cycle count based on subtracting or adding the threshold value from or to the clock cycle count of the third node when transmission of the first and second frames stop.

2. The node system according to claim 1, wherein each node of the plurality of nodes comprises:
  a clock generator, and
  a communication controller configured to:
    transmit a frame in a slot assigned based on a clock cycle count generated every time the clock generator generates a first certain number of clocks in a continuously repeated cycle, and
    manage an initial value of a clock cycle count corresponding to a cycle length of the cycle and a rate correction value for the initial value.

3. The node system according to claim 2, wherein, for each pair of continuous cycles, the third node is configured to:
  delay or advance an end of a preceding cycle of the cycle pair by a certain count,
  advance or delay an end of a later cycle of the cycle pair by the certain count, and
  transmit the third frame while repeating the increase or decrease of the clock cycle count thereafter.

4. The node system according to claim 1, wherein the third node is further configured to:
  cause the first and second nodes to restart transmission of the first and second frames,
  set an intermediate value of the reduced clock cycle count as a clock cycle count, and
  repeatedly transmit the third frame.

5. The node system according to claim 4, wherein the third node is configured to repeatedly transmit the third frame after causing the first and second nodes to restart transmission of the first and second frames.

6. The node system according to claim 4, wherein the third node further sets the intermediate value as the clock cycle count after the transmission of the first and second frames stops, and is further configured to:
  cause the first and second nodes to set the first and second rate correction values such that a cycle length thereof matches a cycle length of the third node; and
  cause the first and second nodes to restart the transmission of the first and second frames.

7. The node system according to claim 4, wherein the intermediate value is a fault-tolerant mid-point value generated by deleting a third certain number of data according to a number of the reduced clock cycle count in order from a maximum value to a minimum value of the reduced clock cycle count and deleting the third certain number of data from the minimum value to the maximum value, and rounding up or rounding off a mean value of a maximum value and a minimum value of remaining reduced clock cycle count.

8. The node system according to claim 4, wherein the intermediate value is a value obtained by rounding up or off a mean value of the reduced clock cycle count.

9. The node system according to claim 1, wherein the third node is configured to:
  transmit the third frame while repeatedly correcting a third rate correction value such that one or more cycles of the plurality of nodes synchronize; and
  determine the reduced clock cycle count when determination is made that each cycle length of the plurality of nodes is in a range of a certain width continuously for a certain number of times.

10. The node system of according to claim 1, wherein the plurality of nodes are connected via a transmission line.

11. A node comprising:
  a clock generator; and
  a communication controller configured to:
    receive first and second frames which are assigned on a basis of a count generated every time the clock generator generates a first certain number of clocks in repeated cycles,
    transmit a third frame assigned based on the count, and
    manage an initial value of a clock cycle count corresponding to a cycle length of each of the cycles and a rate correction value for the initial value, wherein
    the third frame is transmitted while increasing or decreasing the clock cycle count, and a reduced clock cycle count is determined based on subtracting or adding a certain threshold value from or to the clock cycle count when reception of the first and second frames stop.

12. The node according to claim 11, wherein the communication controller is further configured to:
  cause a first and a second node to restart transmission of the first and second frames; and
  set an intermediate value of the reduced clock cycle count as a clock cycle count of the third node, and repeatedly transmit the third frame.

13. The node according to claim 12, wherein the node is connected via a transmission line to at least the first and the second node.

14. The node according to claim 11, wherein the communication controller is further configured to:
- for each cycle pair, delay or advance an end of a preceding cycle of the cycle pair by a certain count,
- advance or delay an end of the later cycle of the cycle pair by the certain count, and
- transmit the third frame while repeating an increase or decrease of the cycle clock count thereafter.

15. A synchronization method executed by a plurality of nodes, the method comprising:
- correcting, by a first node of the plurality of nodes, a first rate correction value such that one or more cycles of the plurality of nodes synchronize;
- transmitting a first frame associated with the first node based on the corrected first rate correction value when an absolute value of the first rate correction value is within a threshold;
- stopping transmission of the first frame when the absolute value of the first rate correction value exceeds the threshold;
- correcting, by a second node of the plurality of nodes, a second rate correction value such that one or more cycles of the plurality of nodes synchronize;
- transmitting a second frame associated with the second node based on the corrected second rate correction value when the absolute value of the second rate correction value is within the threshold;
- stopping transmission of the second frame when the absolute value of the second rate correction value exceeds the threshold;
- transmitting, by the third node, a third frame while increasing or decreasing a clock cycle count; and
- determining a reduced clock cycle count based on subtracting or adding the threshold from or to the clock cycle count of the third node when transmission of the first and second frames stop.

16. The synchronization method according to claim 15, further comprising:
- transmitting, by each of the plurality of nodes, a frame in a slot assigned on a basis of a count generated when a certain number of clocks are generated in a repeated cycle; and
- determining an initial value of the clock cycle count corresponding to a cycle length of each of the cycles and a rate correction value for the initial value.

17. The synchronization method according to claim 15, further comprising:
- causing the first and second nodes to restart transmission of the first and second frames;
- setting an intermediate value for the reduced clock cycle count as the clock cycle count; and
- repeatedly transmitting the third frame.

* * * * *

UNITED STATES PATENT AND TRADEMARK OFFICE
CERTIFICATE OF CORRECTION

PATENT NO. : 8,897,289 B2  
APPLICATION NO. : 14/221011  
DATED : November 25, 2014  
INVENTOR(S) : Suina et al.

It is certified that error appears in the above-identified patent and that said Letters Patent is hereby corrected as shown below:

In the Claims:

Claim 6, column 20, line 12, --start transmission of the third frame;-- should be added after configured to:.

Signed and Sealed this
Twenty-fourth Day of March, 2015

Michelle K. Lee
*Director of the United States Patent and Trademark Office*